(12) United States Patent
Shimizu et al.

(10) Patent No.: US 11,431,030 B2
(45) Date of Patent: Aug. 30, 2022

(54) SOLID STATE BATTERY AND SOLID STATE BATTERY MANUFACTURING METHOD

(71) Applicant: HONDA MOTOR CO., LTD., Tokyo (JP)

(72) Inventors: Wataru Shimizu, Wako (JP); Masahiro Ohta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/838,069

(22) Filed: Apr. 2, 2020

(65) Prior Publication Data

US 2020/0343579 A1   Oct. 29, 2020

(30) Foreign Application Priority Data

Apr. 24, 2019   (JP) .............................. JP2019-082955

(51) Int. Cl.
*H01M 50/54* (2021.01)
*H01M 50/50* (2021.01)
(Continued)

(52) U.S. Cl.
CPC ..... *H01M 10/058* (2013.01); *H01M 10/0459* (2013.01); *H01M 50/54* (2021.01)

(58) Field of Classification Search
CPC .... H01M 50/20; H01M 50/10; H01M 10/058; H01M 10/04
See application file for complete search history.

(56) References Cited

U.S. PATENT DOCUMENTS

| 6,679,926 B1 * | 1/2004 | Kajiura | ............... | H01M 10/045 |
| | | | | 29/623.1 |
| 2014/0272537 A1 * | 9/2014 | Kretschmar | ........ | H01M 50/538 |
| | | | | 429/149 |

FOREIGN PATENT DOCUMENTS

| JP | 03-116661 | 5/1991 |
| JP | 2000-335512 | 12/2000 |
| | (Continued) | |

OTHER PUBLICATIONS

Japanese Notice of Allowance for Japanese Patent Application No. 2019-082955 dated Apr. 5, 2022.

*Primary Examiner* — Kenneth J Douyette
(74) *Attorney, Agent, or Firm* — Amin, Turocy & Watson, LLP

(57) ABSTRACT

What is provided is a solid state battery which can be manufactured with a high yield, has little variation in initial performance, and has a long lifespan and a method of manufacturing the same. A solid state battery includes a flat laminated structure which is obtained by winding an electrode laminated sheet extending from a first end to a second end. In the electrode laminated sheet, a first sheet and a second sheet are disposed while a first connection portion and a second connection portion face each other in a plan view, a first region in which a first solid electrolyte sheet, a first electrode, a second solid electrolyte sheet, and a second electrode piece are laminated in this order and a second region in which a second electrode piece, a first solid electrolyte sheet, a first electrode, and a second solid electrolyte sheet are laminated in this order are alternately formed in a longitudinal direction between the first connection portion and the second connection portion, and the electrode laminated sheet is wound around the first end so that the first electrode and the second electrode piece are alternately laminated so as to overlap each other in a plan view.

7 Claims, 10 Drawing Sheets

(51) Int. Cl.
*H01M 10/058* (2010.01)
*H01M 10/04* (2006.01)

(56) References Cited

FOREIGN PATENT DOCUMENTS

| | | |
|---|---|---|
| JP | 2002-329530 | 11/2002 |
| JP | 2011-222288 | 11/2011 |
| JP | 2013-524431 | 6/2013 |
| JP | 2015-118788 | 6/2015 |
| JP | 2015-118870 | 6/2015 |
| JP | 2018-166080 | 10/2018 |

\* cited by examiner

SOLID STATE BATTERY AND SOLID STATE BATTERY MANUFACTURING METHOD

CROSS-REFERENCE TO RELATED APPLICATION

Priority is claimed on Japanese Patent Application No. 2019-082955, filed Apr. 24, 2019, the content of which is incorporated herein by reference.

BACKGROUND OF THE INVENTION

Field of the Invention

The present invention relates to a solid state battery and a solid state battery manufacturing method.

Description of Related Art

A solid state battery in which a solid electrolyte is disposed between a positive electrode and a negative electrode is notable for its higher safety, wider usable temperature range, and shorter charging time compared to a conventional lithium secondary battery.

As a solid state battery manufacturing method, for example, there is proposed an integration method of pressure-bonding a first laminated body and a second laminated body to each other, the first laminated body being formed such that a positive electrode mixture layer as a positive electrode layer is pressure-bonded to a first solid electrolyte layer and the second laminated body being formed such that a negative electrode mixture layer as a negative electrode layer is pressure-bonded to a second solid electrolyte layer (for example, see Japanese Unexamined Patent Application, First Publication No. 2015-118870).

Further, as a solid state battery with a wound solid electrolyte layer, a solid state battery with a charging and discharging unit including a solid electrolyte layer and positive and negative electrode layers sandwiching the solid electrolyte layer is known, the charging and discharging unit includes a curved portion and a flat portion, and a solid electrolyte disposed in the curved portion is different from a solid electrolyte disposed in the flat portion (for example, see Japanese Unexamined Patent Application, First Publication No. 2011-222288).

SUMMARY OF THE INVENTION

In the solid state battery with the wound solid electrolyte layer, since a positive electrode active material layer and a negative electrode active material layer are easily cracked or chipped during a press-molding process performed when manufacturing the solid state battery, a problem arises in that a yield is low.

Further, in the solid state battery with the wound solid electrolyte layer, when a constraint pressure is applied in a use state, this pressure is mainly applied to the flat portion formed as a plane substantially orthogonal to the pressing direction. Then, a pressure smaller than that on the flat portion is applied to the curved portion excluding the flat portion. For this reason, in the solid state battery with the wound solid electrolyte layer, since there is a difference in battery performance between the flat portion and the curved portion, a variation in initial performance and a difference in deterioration characteristics easily occur.

Further, in the solid state battery with the wound solid electrolyte layer, since a constraint pressure is applied in a use state, the positive electrode active material layer and the negative electrode active material layer are easily cracked or chipped and sufficient lifespan cannot be obtained.

The present invention has been made in view of the above-described circumstances and an object of the present invention is to provide a solid state battery which can be manufactured with a high yield, has little variation in initial performance, and has a long lifespan and a method of manufacturing the same.

In order to achieve the above-described object, the present invention provides the following means.

[1] A solid state battery including: a flat laminated structure which is obtained by winding an electrode laminated sheet having a first sheet, a second sheet, and a solid electrolyte sheet laminated therein and extending from a first end to a second end, wherein the first sheet includes a first connection portion which is formed by a first current collector layer and extends in a belt shape and a first electrode in which a first electrode active material layer is formed on the first current collector layer, wherein the second sheet has a comb shape in a plan view by including a second connection portion which is formed by a second current collector layer and extends in a belt shape and a plurality of second electrode pieces which have a second electrode active material layer formed on the second current collector layer and are connected to a side surface of the second connection portion and a gap between the adjacent second electrode pieces becomes wider gradually from the first end toward the second end, wherein the solid electrolyte sheet includes a first solid electrolyte sheet and a second solid electrolyte sheet which are respectively disposed on both surfaces of the first sheet so as to sandwich the first electrode and a width of the first solid electrolyte sheet and the second solid electrolyte sheet is equal to or larger than a width of the first electrode, wherein in the electrode laminated sheet, the first sheet and the second sheet are disposed so that the first connection portion and the second connection portion face each other in a plan view, wherein a first region and a second region are alternately formed in a longitudinal direction between the first connection portion and the second connection portion, the first region being formed such that the first solid electrolyte sheet, the first electrode, the second solid electrolyte sheet, and the second electrode piece are laminated in this order and the second region being formed such that the second electrode piece, the first solid electrolyte sheet, the first electrode, and the second solid electrolyte sheet are laminated in this order, and wherein the electrode laminated sheet is wound around the first end so that the first electrode and the second electrode piece are alternately laminated so as to overlap each other in a plan view.

[2] The solid state battery according to [1], wherein the first sheet has a comb shape in a plan view by including the first connection portion and a plurality of first electrode pieces which have a first electrode active material layer formed on the first current collector layer and are connected to a side surface of the first connection portion and a gap between the adjacent first electrode pieces becomes wider gradually from the first end toward the second end, wherein the first solid electrolyte sheet and the second solid electrolyte sheet are disposed so as to sandwich the first electrode piece, wherein in the first region, the first solid electrolyte sheet, the first electrode piece, the second solid electrolyte sheet, and the second electrode piece are laminated in this order, wherein in the second region, the second electrode piece, the first solid electrolyte sheet, the first electrode piece, and the second solid electrolyte sheet are laminated in wound around the first end so that the first electrode piece and the second electrode piece are alternately laminated so as to overlap each other in a plan view.

[3] The solid state battery according to [1] or [2], wherein the first electrode active material layer is a negative electrode active material layer and the second electrode active material layer is a positive electrode active material layer.

[4] A method of manufacturing the solid state battery according to any one of [1] to [3], including: forming a first sheet including a first connection portion which is formed by a first current collector layer and extends in a belt shape and a first electrode in which a first electrode active material layer is formed on the first current collector layer; forming a second sheet having a comb shape in a plan view by including a second connection portion which is formed by a second current collector layer and extends in a belt shape and a plurality of second electrode pieces which have a second electrode active material layer formed on the second current collector layer and are connected to a side surface of the second connection portion so that a gap between the adjacent second electrode pieces becomes wider gradually from the first end toward the second end; forming a laminated sheet by respectively laminating a first solid electrolyte sheet having a width equal to or larger than a width of the first electrode and a second solid electrolyte sheet having a width equal to or larger than the width of the first electrode on both surfaces of the first sheet so as to sandwich the first electrode; forming an electrode laminated sheet by disposing the laminated sheet while the first connection portion and the second connection portion face each other in a plan view so as to sew between the adjacent second electrode pieces so that a first region in which the first solid electrolyte sheet, the first electrode, the second solid electrolyte sheet, and the second electrode piece are laminated in this order and a second region in which the second electrode piece, the first solid electrolyte sheet, the first electrode, and the second solid electrolyte sheet are laminated in this order are alternately formed in a longitudinal direction between the first connection portion and the second connection portion and a gap between the first region and the second region adjacent to each other becomes wider gradually from the first end toward the second end, and winding the electrode laminated sheet around the first end in a flat shape.

Since the solid state battery of the present invention includes the flat laminated structure obtained by winding a specific electrode laminated sheet, the second electrode active material layer exists only in the flat portion to which a pressure during a press-molding process and a constraint pressure in a use state are mainly applied and the second electrode active material layer does not exist in the curved portion which is a region excluding the flat portion. Thus, in the solid state battery of the present invention, the second electrode active material layer is not easily cracked and/or chipped even when a pressure during a press-molding process and a constraint pressure in a use state are applied as compared with the case of the conventional solid state battery in which the first electrode active material layer and the second electrode active material layer are disposed in a curved state in the curved portion. Thus, the solid state battery of the present invention can be manufactured with a good yield and can have a long lifespan as compared with the case of the conventional solid state battery in which the first electrode active material layer and the second electrode active material layer are disposed in a curved state in the curved portion.

Further, in the solid state battery of the present invention, the second electrode active material layer exists only in the flat portion to which a constraint pressure in a use state is mainly applied. Thus, a variation in initial performance of the solid state battery of the present invention is determined by a difference in the battery performance in the flat portion. Thus, the solid state battery of the present invention has a little variation in initial performance as compared with the conventional solid state battery in which the first electrode active material layer and the second electrode active material layer are disposed in a curved state in the curved portion.

Further, since the solid state battery of the present invention includes the flat laminated structure obtained by winding the electrode laminated sheet, the solid state battery can be manufactured by a simple method of winding the electrode laminated sheet and hence productivity is excellent.

Further, in the solid state battery of the present invention, since the second electrode active material layer is not easily cracked and/or chipped even when a constraint pressure in a use state is applied, the performance can be improved by increasing the constraint pressure.

Further, in the solid state battery of the present invention, since the second electrode active material layer does not exist in the curved portion, the curvature radius can be decreased and the length of the first current collector layer and the second current collector layer of the electrode laminated sheet existing in the curved portion can be shortened as compared with the conventional solid state battery in which the first electrode active material layer and the second electrode active material layer are also disposed in the curved portion. As a result, in the solid state battery of the present invention, the ratio of the volume of the curved portion in the volume of the solid state battery can be decreased and high energy density can be obtained as compared with the case of the conventional solid state battery in which the first electrode active material layer and the second electrode active material layer are disposed in the curved portion.

DETAILED DESCRIPTION OF THE INVENTION

Figure 1:
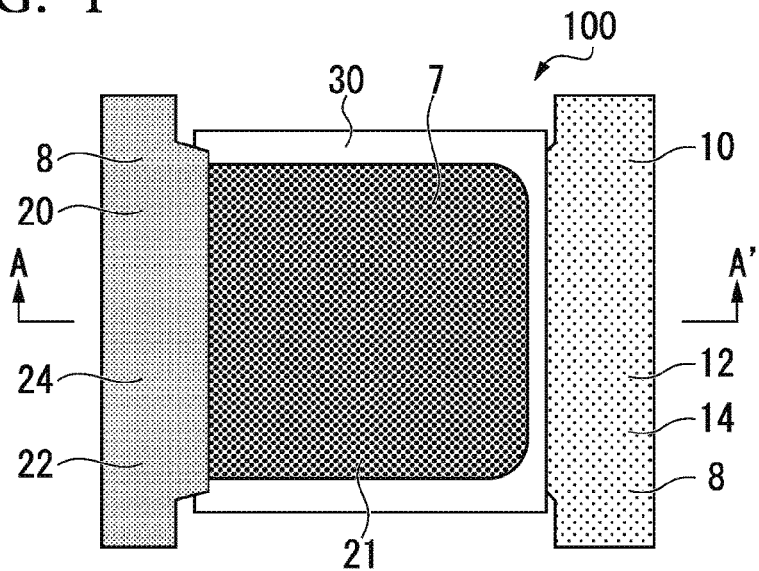
FIG. 1 is a plan view showing a solid state battery of a first embodiment of the present invention.

Hereinafter, a solid state battery and a solid state battery manufacturing method of the present invention will be described in detail with reference to the drawings. In the drawings used in the following description, a characteristic portion may be enlarged for convenience of description in order to easily understand the characteristic of the present invention. For this reason, the dimensional ratio of each component may be different from the actual one. Further, the materials, dimensions, and the like exemplified in the following description are examples. Thus, the present invention is not limited only to the embodiments described below and can be implemented with appropriate changes without changing the requirements of the present invention.

First Embodiment

[Solid State Battery]

Figure 2:
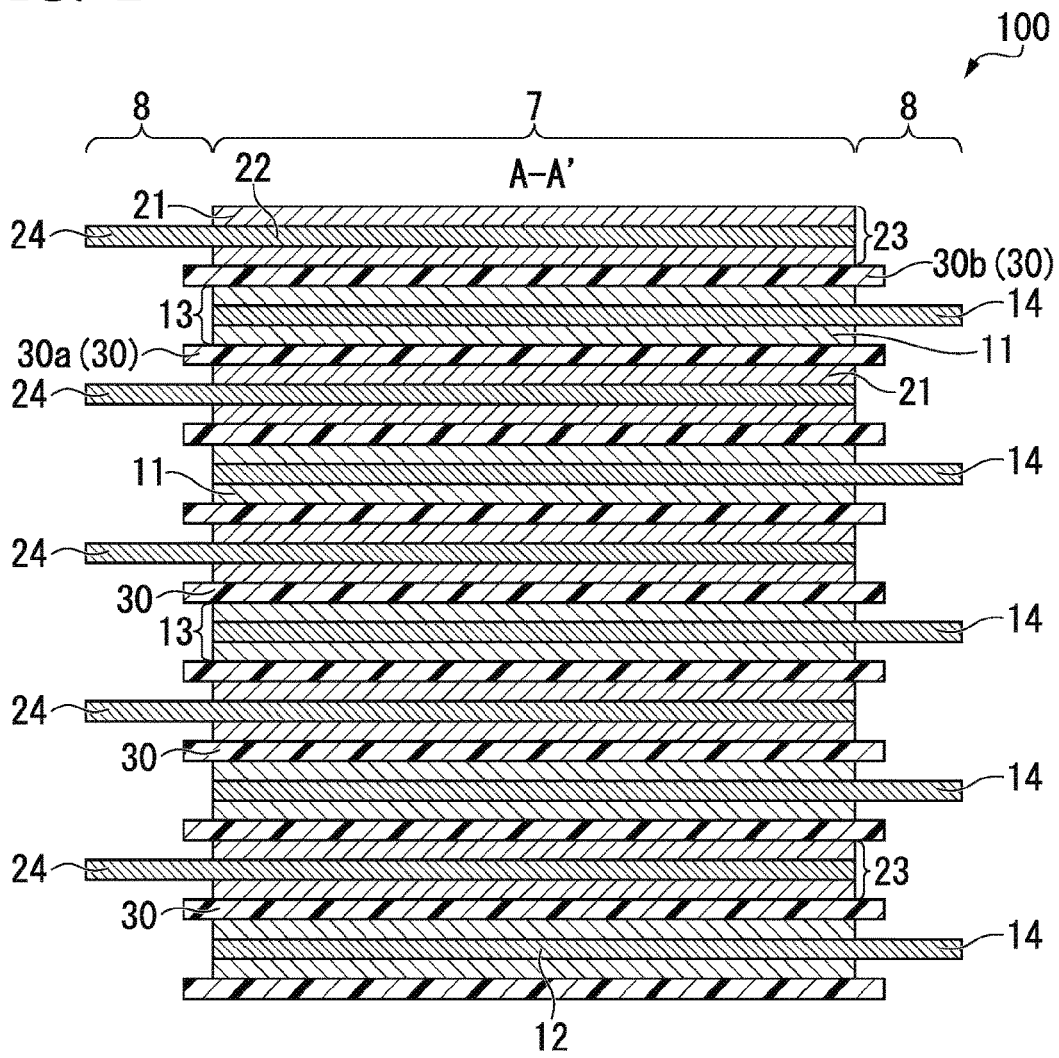
FIG. 2 is a cross-sectional view taken along a line A-A' of the solid state battery shown in FIG. 1.
Figure 3:
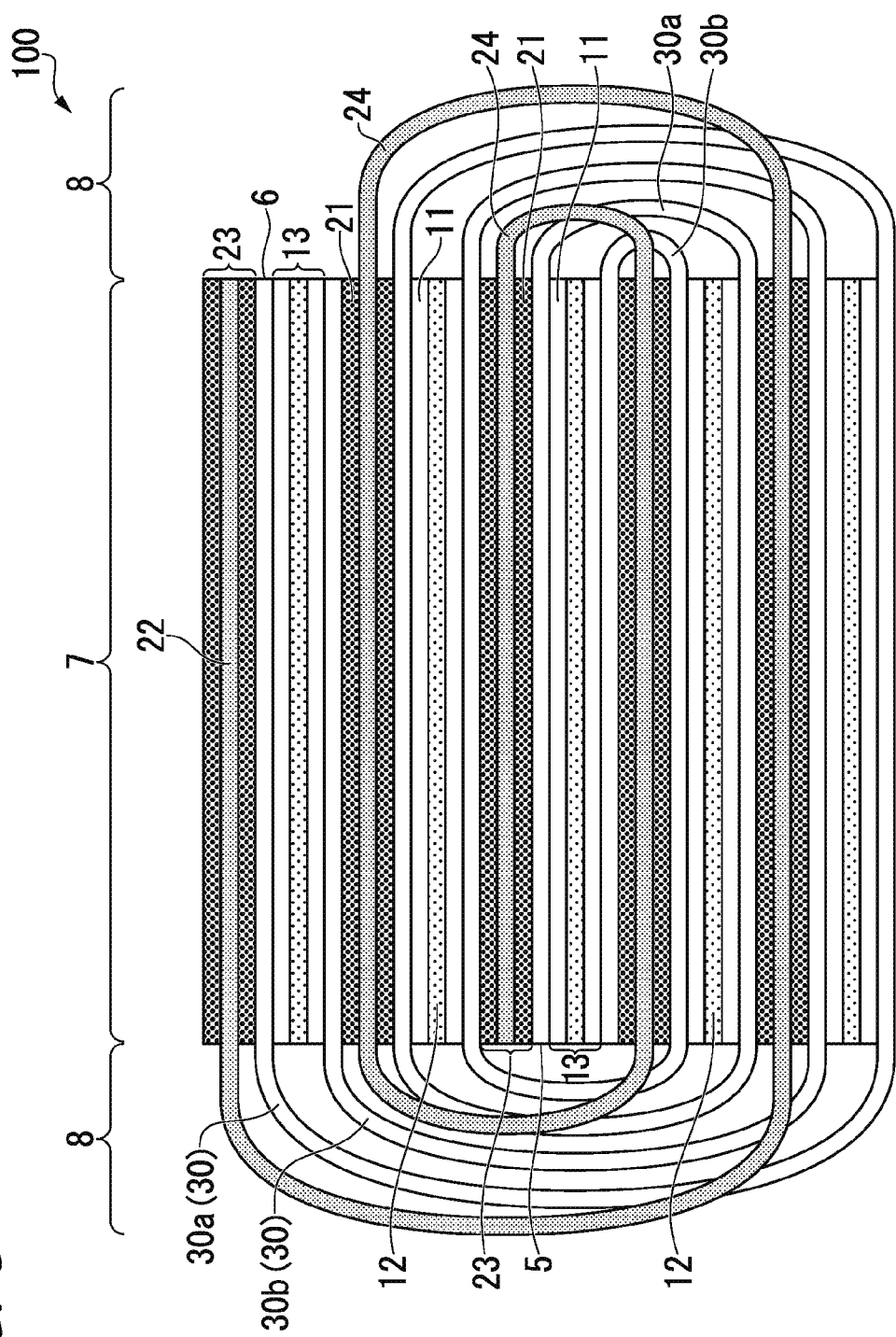
FIG. 3 is a side view in which the solid state battery shown in FIG. 1 is viewed from the left side in FIG. 1.
Figure 4:
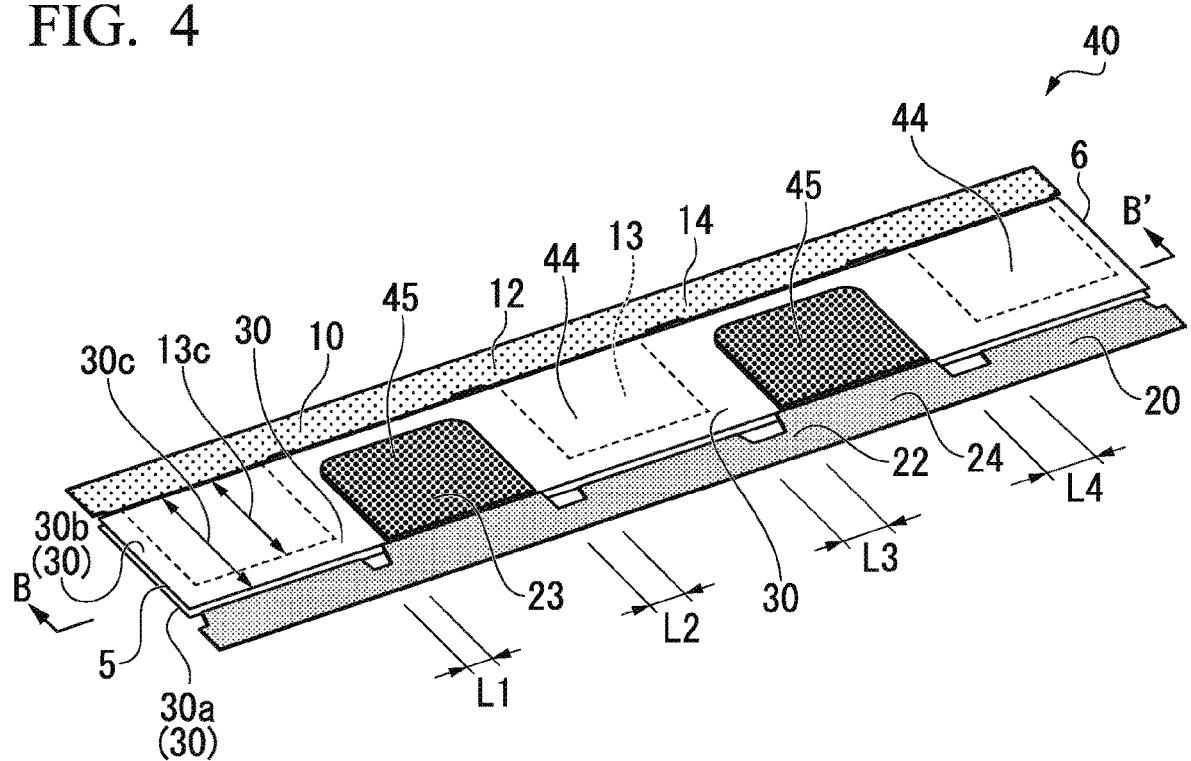
FIG. 4 is a perspective view of an electrode laminated sheet of the solid state battery of the first embodiment.
Figure 5:
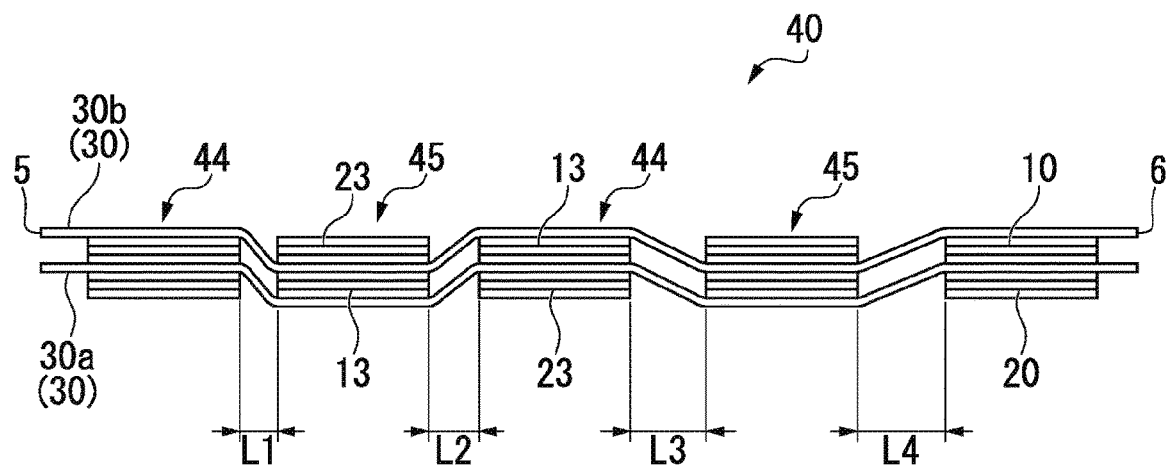
FIG. 5 is a cross-sectional view taken along a line B-B' of the electrode laminated sheet shown in FIG. 4.
Figure 6:
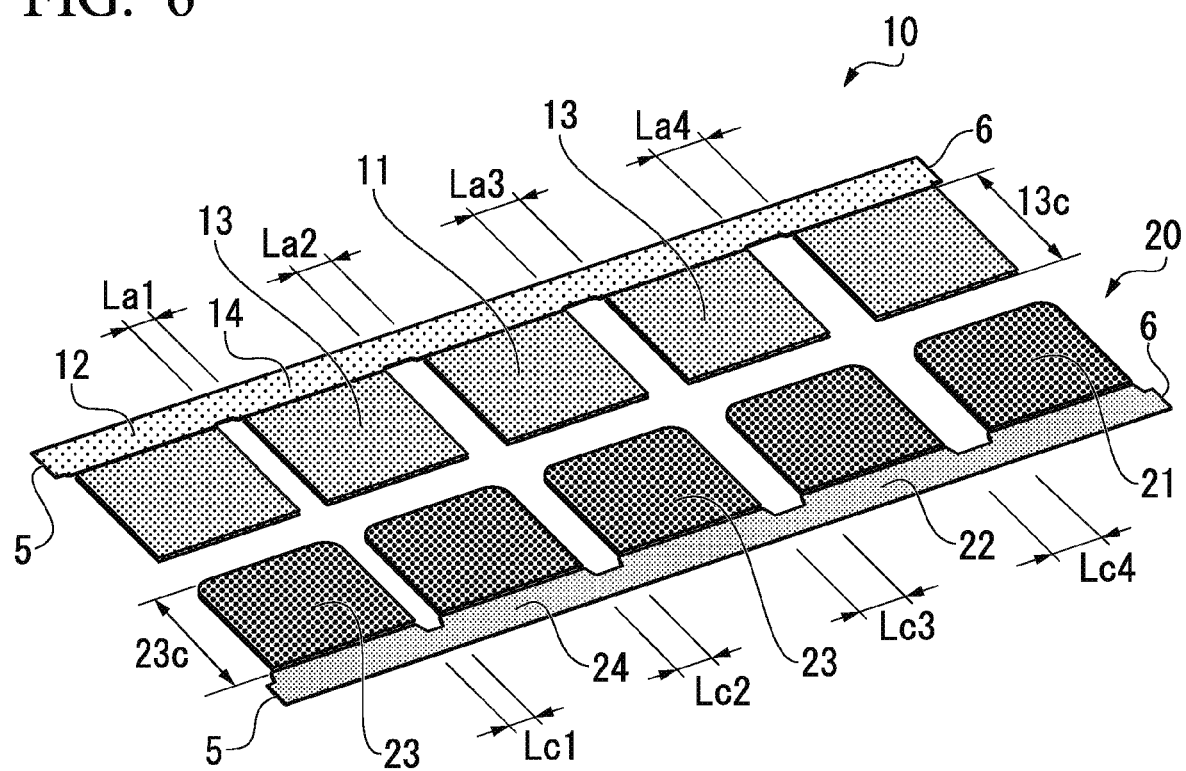
FIG. 6 is a perspective view showing an example of a positive electrode sheet and a negative electrode sheet used in a solid state battery manufacturing method of the first embodiment.

FIG. 1 is a plan view showing a solid state battery of a first embodiment of the present invention. FIG. 2 is a cross-sectional view taken along a line A-A' of the solid state battery shown in FIG. 1. FIG. 3 is a side view in which the solid state battery shown in FIG. 1 is viewed from the left side in FIG. 1. FIG. 4 is a perspective view of an electrode laminated sheet of the solid state battery of the first embodiment. FIG. 5 is a cross-sectional view taken along a line B-B' of the electrode laminated sheet shown in FIG. 4. FIG. 6 is a perspective view showing an example of a positive electrode sheet and a negative electrode sheet used in a solid state battery manufacturing method of the first embodiment.

A solid state battery 100 of this embodiment shown in FIGS. 1 to 3 is a solid-state lithium ion secondary battery having a flat laminated structure (see FIGS. 2 and 3) obtained by winding an electrode laminated sheet 40 shown in FIGS. 4 and 5.

In the solid state battery 100 of this embodiment shown in FIGS. 1 to 3, a protection layer (not shown) may be formed on the uppermost layer and/or the lowermost layer of the flat laminated structure. Further, the solid state battery 100 of this embodiment is preferably accommodated in an exterior material (not shown) formed of a film in a sealed state.

Reference numeral 7 in FIGS. 1 to 3 denotes a flat portion. The flat portion 7 is a region to which a pressure generated by a press-molding operation and a constraint pressure generated in a use state are mainly applied. Further, reference numeral 8 in FIGS. 1 to 3 denotes a curved portion which is a region excluding the flat portion 7 in a plan view.

As shown in FIGS. 2 and 3, the flat portion 7 includes a negative electrode piece 13 (corresponding to a "first electrode piece" of claims), a positive electrode piece 23 (corresponding to a "second electrode piece" of claims), and a solid electrolyte sheet 30 disposed between the negative electrode piece 13 and the positive electrode piece 23.

In the solid state battery 100 of this embodiment, charging and discharging are performed by exchanging lithium ions through a solid electrolyte contained in the solid electrolyte sheet 30 between a negative electrode active material layer 11 (corresponding to a "first electrode active material layer" of claims) of the negative electrode piece 13 and a positive electrode active material layer 21 (corresponding to a "second electrode active material layer" of claims) of the positive electrode piece 23 facing the negative electrode active material layer 11.

In the negative electrode piece 13, the negative electrode active material layer 11 is formed on a negative electrode current collector layer 12 (corresponding to a "first current collector layer" of claims). In the solid state battery 100 of this embodiment, as shown in FIGS. 2 and 3, one in which the negative electrode active material layer 11 is formed on both surfaces of the negative electrode current collector layer 12 is used as the negative electrode piece 13.

In the positive electrode piece 23, the positive electrode active material layer 21 is formed on a positive electrode current collector layer 22 (corresponding to a "second current collector layer" of claims). In the solid state battery 100 of this embodiment, as shown in FIGS. 2 and 3, one in which the positive electrode active material layer 21 is formed on both surfaces of the positive electrode current collector layer 22 is used as the positive electrode piece 23.

As shown in FIGS. 1 to 3, the curved portion 8 is formed by the solid electrolyte sheet 30, a negative electrode connection portion 14 (corresponding to a "first connection portion" of claims) (not shown in FIG. 3) formed by the negative electrode current collector layer 12, and a positive electrode connection portion 24 (corresponding to a "second connection portion" of claims) formed by the positive electrode current collector layer 22.

That is, in the solid state battery 100 of this embodiment, the negative electrode active material layer 11 and the positive electrode active material layer 21 exist only in the flat portion 7 and the negative electrode active material layer 11 and the positive electrode active material layer 21 do not exist in the curved portion 8.

As shown in FIGS. 4 and 5, the electrode laminated sheet 40 of the solid state battery 100 of this embodiment extends from a first end 5 (a left end in FIGS. 4 and 5) to a second end 6 (a right end in FIGS. 4 and 5). In the solid state battery 100 of this embodiment, as shown in FIG. 3, the electrode laminated sheet 40 is wound around the first end 5.

As shown in FIGS. 4 and 5, the electrode laminated sheet 40 is one in which a negative electrode sheet 10 (corresponding to a "first sheet" of claims) (see FIG. 6), a positive electrode sheet 20 (corresponding to a "second sheet" of claims) (see FIG. 6), and two solid electrolyte sheets 30a and 30b disposed so as to sandwich and the negative electrode sheet 10 are laminated.

The negative electrode sheet 10 includes the negative electrode connection portion 14 and the plurality of negative electrode pieces 13 as shown in FIG. 6.

The negative electrode connection portion 14 extends in a belt shape as shown in FIG. 6. The negative electrode connection portion 14 is a region in which the negative electrode active material layer 11 on the negative electrode current collector layer 12 is not formed and is formed by the negative electrode current collector layer 12. The negative electrode connection portion 14 functions as a negative electrode drawn electrode and is electrically connected to an external electrode (not shown).

The negative electrode piece 13 is one in which the negative electrode active material layer 11 is formed on the negative electrode current collector layer 12. The plurality of negative electrode pieces 13 are respectively connected to a side surface of the negative electrode connection portion 14 as shown in FIG. 6.

Gaps La1, La2, La3, and La4 between the adjacent negative electrode pieces 13 become wider gradually from the first end 5 toward the second end 6 as shown in FIG. 6 (La1<La2<La3<La4).

As shown in FIG. 6, the negative electrode piece 13 of the electrode laminated sheet 40 has a substantially rectangular shape in a plan view.

The positive electrode sheet 20 includes the positive electrode connection portion 24 and the plurality of positive electrode pieces 23 as shown in FIG. 6.

The positive electrode connection portion 24 extends in a belt shape as shown in FIG. 6. The positive electrode connection portion 24 is a region in which the positive electrode active material layer 21 on the positive electrode current collector layer 22 is not formed and is formed by the positive electrode current collector layer 22. The positive electrode connection portion 24 functions as a positive electrode drawn electrode and is electrically connected to an external electrode (not shown).

The positive electrode piece 23 is one in which the positive electrode active material layer 21 is formed on the positive electrode current collector layer 22. The plurality of positive electrode pieces 23 are respectively connected to a side surface of the positive electrode connection portion 24 as shown in FIG. 6.

Gaps Lc1, Lc2, Lc3, and Lc4 between the adjacent positive electrode pieces 23 become wider gradually from the first end 5 toward the second end 6 as shown in FIG. 6 (Lc1<Lc2<Lc3<Lc4).

As shown in FIG. 6, the positive electrode piece 23 of the electrode laminated sheet 40 has a substantially rectangular shape in a plan view and a corner portion disposed on the side opposite to the positive electrode connection portion 24 is chamfered as a curved surface. Accordingly, the positive electrode active material layer 21 of the positive electrode piece 23 is prevented from being cracked or chipped.

An area of each positive electrode piece 23 of the electrode laminated sheet 40 is equal to or smaller than an area of each negative electrode piece 13.

As shown in FIGS. 4 and 5, the solid electrolyte sheets 30 are respectively disposed on both surfaces of the negative electrode sheet 10 so as to sandwich the negative electrode piece 13 of the negative electrode sheet 10. A first solid electrolyte sheet 30a disposed on the lower side of the negative electrode piece 13 and a second solid electrolyte sheet 30b disposed on the upper side of the negative electrode piece 13 have the same width 30c. The width 30c of the first solid electrolyte sheet 30a and the second solid electrolyte sheet 30b is equal to or larger than the width 13c of the negative electrode piece 13 and is preferably wider than the width 13c of the negative electrode piece 13 as shown in FIGS. 4 and 5. In the solid state battery 100 of this embodiment, since the width 30c of the first solid electrolyte sheet 30a and the second solid electrolyte sheet 30b is wider than the width 13c of the negative electrode piece 13, it is preferable in that short-circuiting between the negative electrode piece 13 and the positive electrode piece 23 hardly occurs. Further, as shown in FIGS. 4 and 5, the first solid electrolyte sheet 30a and the second solid electrolyte sheet 30b continuously extend between the first end 5 and the second end 6.

In the electrode laminated sheet 40, as shown in FIG. 4, the negative electrode sheet 10 and the positive electrode sheet 20 are disposed so that the negative electrode connection portion 14 and the positive electrode connection portion 24 face each other in a plan view.

A first region 45 in which the first solid electrolyte sheet 30a, the negative electrode piece 13, the second solid electrolyte sheet 30b, and the positive electrode piece 23 are laminated in this order from below in FIG. 5 and a second region 44 in which the positive electrode piece 23, the first solid electrolyte sheet 30a, the negative electrode piece 13, and the second solid electrolyte sheet 30b are laminated in this order from below in FIG. 5 are alternately formed in the longitudinal direction between the negative electrode connection portion 14 and the positive electrode connection portion 24.

In the electrode laminated sheet 40, as shown in FIGS. 4 and 5, gaps L1, L2, L3, and L4 between the first region 45 and the second region 44 which are adjacent to each other become wider gradually from the first end 5 toward the second end 6 (L1<L2<L3<L4). The gaps L1, L2, L3, and L4 between the first region 45 and the second region 44 which are adjacent to each other are dimensions corresponding to a dimension between the adjacent negative electrode pieces 13 of the negative electrode sheet 10 and a dimension between the adjacent positive electrode pieces 23 of the positive electrode sheet 20.

Each of the gaps L1, L2, L3, and L4 between the first region 45 and the second region 44 which are adjacent to each other is determined by adjusting the length of the negative electrode connection portion 14 and the positive electrode connection portion 24 in consideration of the length of the solid electrolyte sheet 30, the negative electrode piece 13, and the positive electrode piece 23 in the longitudinal direction of the electrode laminated sheet 40, the thickness of each layer, the position in the longitudinal direction of the electrode laminated sheet 40, and the workability at the time of winding the electrode laminated sheet 40.

In the solid state battery 100 of this embodiment, the gaps L1, L2, L3, and L4 between the first region 45 and the second region 44 which are adjacent to each other become wider gradually from the first end 5 toward the second end 6. For this reason, when the electrode laminated sheet 40 is wound around the first end 5, as shown in FIG. 3, the length of the solid electrolyte sheet 30 of the electrode laminated sheet 40, the negative electrode connection portion 14 (not shown in FIG. 3) formed by the negative electrode current collector layer 12, and the positive electrode connection portion 24 formed by the positive electrode current collector layer 22 becomes shorter toward the inside of the curved portion 8. Thus, it is possible to prevent a decrease in workability by preventing the solid electrolyte sheet 30, the negative electrode connection portion 14, and the positive electrode connection portion 24 that become the curved portion 8 from being excessively bent and entangled when winding the electrode laminated sheet 40. Further, it is possible to shorten the length of the solid electrolyte sheet 30, the negative electrode connection portion 14, and the positive electrode connection portion 24 disposed on the inside of the curved portion 8 when the electrode laminated sheet 40 is wound around the first end 5 as compared with a case in which the gaps L1, L2, L3, and L4 between the first region 45 and the second region 44 which are adjacent to each other are constant. In other words, the electrode laminated sheet 40 of the solid state battery 100 of this embodiment has the same number of the first regions 45 and the second regions 44 and the length of the electrode laminated sheet can be shorter than in a case in which the gaps L1, L2, L3, and L4 between the first region 45 and the second region 44 which are adjacent to each other are constant. As a result, the ratio of the volume of the curved portion 8 in the volume of the solid state battery 100 can be decreased.

In the solid state battery 100 of this embodiment, since the electrode laminated sheet 40 is wound around the first end 5, the negative electrode piece 13 and the positive electrode piece 23 are alternately laminated in a plurality of layers (in this embodiment, five layers for each of them) so as to overlap each other in a plan view. The number of times of laminating the negative electrode piece 13 and the positive electrode piece 23 can be appropriately determined in response to the application or the like of the solid state battery 100 and is not particularly limited.

In this embodiment, as shown in FIG. 3, since the electrode laminated sheet 40 is wound around the first end 5, the second solid electrolyte sheet 30b of the second region 44 (see FIGS. 4 and 5) closest to the first end 5 is laminated so as to be in contact with the positive electrode piece 23 of the adjacent first region 45. Further, the positive electrode piece 23 of the second region 44 closest to the first end 5 is laminated so as to be in contact with the second solid electrolyte sheet 30b of the adjacent second region 44. In this way, since the electrode laminated sheet 40 is wound around the first end 5 without providing the center gap and/or the solid electrolyte sheet, the flat portion 7 in which the negative electrode piece 13 and the positive electrode piece 23 are alternately laminated with the solid electrolyte sheet 30 interposed therebetween and the curved portion 8 which includes the solid electrolyte sheet 30, the negative electrode connection portion 14, and the positive electrode connection portion 24 are formed.

The negative electrode current collector layer 12 may be formed of a material having high conductivity. Examples of the highly conductive material include metals containing at least one metal element of silver (Ag), palladium (Pd), gold (Au), platinum (Pt), aluminum (Al), copper (Cu), and nickel (Ni), alloys such as stainless steel (SUS), or non-metals such as carbon (C). Among these highly conductive materials, it is preferable to use copper, SUS, or nickel in consideration of the manufacturing cost in addition to the high conductivity. Particularly, SUS does not easily react with the negative electrode active material, the positive electrode active material, and the solid electrolyte. For that reason, when copper is used as the material of the negative electrode current collector layer 12, the internal resistance of the solid state battery 100 can be preferably reduced.

As a shape of the negative electrode current collector layer 12, for example, a plate shape, a foil shape, a mesh shape, a nonwoven fabric shape, a foam shape, and the like are exemplary examples.

As the negative electrode current collector layer 12, in order to improve the adhesion to the negative electrode active material layer 11, a carbon layer or the like may be disposed on the surface and the surface may be roughened.

The negative electrode active material layer 11 of the negative electrode piece 13 contains a negative electrode active material that exchanges lithium ions and electrons. As the negative electrode active material, a known negative electrode active material applicable as the negative electrode active material of the solid-state lithium-ion battery can be used and a material having high electron conductivity is preferable so that lithium ions can be reversibly released and occluded and electron transport can be easily performed. Specifically, as the negative electrode active material, carbonaceous materials such as natural graphite, artificial graphite, resin charcoal, carbon fiber, activated carbon, hard carbon, and soft carbon; alloy materials mainly composed of tin, tin alloy, silicon, silicon alloy, gallium, gallium alloy, indium, indium alloy, aluminum, aluminum alloy, or the like; conductive polymers such as polyacene, polyacetylene, and polypyrrole; metal lithium; lithium titanium composite oxide (for example, $Li_4Ti_5O_{12}$); and the like are exemplified. The negative electrode active material may use one of the above-described materials alone or two or more of them in combination.

The negative electrode active material layer 11 may contain a conductive additive to improve conductivity. As the conductive additive, a known conductive additive that can be used for a solid-state lithium-ion battery can be used. Specifically, examples of the conductive additive include carbon materials such as carbon black such as acetylene black and Ketjen black; carbon fiber; vapor-grown carbon fiber; graphite powder; and carbon nanotube. The conductive additive may use one of the above-described materials alone or two or more of them in combination.

The negative electrode active material layer 11 may contain a solid electrolyte in order to improve lithium ion conductivity. As the solid electrolyte, one capable of conducting lithium ions may be used. For example, at least one selected from a group consisting of inorganic solid electrolytes such as perovskite-type compounds such as $La_{0.51}Li_{0.34}TiO_{2.94}$ and $La_{0.5}Li_{0.5}TiO_3$, lithicon-type compounds such as $Li_{14}Zn(GeO_4)_4$, garnet-type compounds such as $Li_7La_3Zr_2Oi_2$, nasicon-type compounds such as $Li_{1.3}Al_{0.3}Ti_{1.7}(PO_4)_3$ and $Li_{1.5}Al_{0.5}Ge_{1.5}(PO_4)_3$, thiolysicon-type compounds such as $Li_{3.25}Ge_{0.25}P_{0.75}S_4$ and $Li_3PS_4$, glass compounds such as $Li_4SiO_{4.50}Li_3BO_3$, $Li_2S$—$P_{2S5}$, and $Li_2O$—$Li_3O_5$—$SiO_2$, phosphoric acid compounds such as $Li_3PO_4$, $Li_{3.5}Si_{0.5}P_{0.5}O_4$ and $Li_{2.9}PO_{3.3}N_{0.46}$, amorphous such as $Li_{2.9}PO_{3.3}N_{0.46}$ (LIPON) and $Li_{3.6}Si_{0.6}P_{0.4}O_4$, glass ceramics such as $Li_{1.07}Al_{0.69}Ti_{1.46}(PO_4)_3$ and $Li_{1.5}Al_{0.5}Ge_{1.5}(PO_4)_3$, and lithium-containing salt, polymer-based solid electrolytes such as polyethylene oxide, gel-based solid electrolytes containing lithium-containing salts or lithium ion conductive ionic liquids, and the like can be used.

Further, the negative electrode active material layer 11 may contain a binder having a role of binding the negative electrode active materials to each other and binding the negative electrode active material and the negative electrode current collector layer 12 to each other. As the binder, a known binder which can be used in the solid-state lithium-ion battery can be used.

The positive electrode current collector layer 22 may be formed of a material having high conductivity. Examples of the highly conductive material include metals containing at least one metal element of silver (Ag), palladium (Pd), gold (Au), platinum (Pt), aluminum (Al), copper (Cu), and nickel (Ni), alloys such as stainless steel (SUS), or non-metals such as carbon (C). Among these highly conductive materials, it is preferable to use aluminum or nickel in consideration of the manufacturing cost in addition to the high conductivity. Particularly, aluminum does not easily react with the negative electrode active material, the positive electrode active material, and the solid electrolyte.

For that reason, when aluminum is used as the material of the positive electrode current collector layer 22, the internal resistance of the solid state battery 100 can be preferably reduced.

As the shape of the positive electrode current collector layer 22, for example, a plate shape, a foil shape, a mesh shape, a nonwoven fabric shape, a foam shape, and the like are exemplary examples.

As the positive electrode current collector layer 22, in order to improve the adhesion to the positive electrode active material layer 21, a carbon layer or the like may be disposed on the surface and the surface may be roughened.

The positive electrode active material layer 21 of the positive electrode piece 23 contains a positive electrode active material that exchanges lithium ions and electrons. As the positive electrode active material, a known positive electrode active material applicable as the positive electrode active material of the solid-state lithium-ion battery can be used and a material which can reversibly release and occlude lithium ions and can transport electrons is preferably used. Specifically, as the positive electrode active material, composite oxides such as lithium cobalt oxide ($LiCoO_2$), lithium nickel oxide ($LiNiO_2$), lithium manganese oxide ($LiMn_2O_4$), solid solution oxide ($Li_2MnO_3$—$LiMO_2$ (M=Co, Ni, or the like)), lithium-manganese-nickel oxide ($LiNi_{1/3}Mn_{1/3}Co_{1/3}O_2$), and olivine type lithium phosphate ($LiFePO_4$); conductive polymers such as polyaniline and polypyrrole; sulfides such as $Li_2S$, CuS, Li—Cu—S compounds, $TiS_2$, FeS, $MoS_2$, and Li—Mo—S compounds; a mixture of sulfur and carbon; and the like are exemplified. The positive electrode active material may use one of the above-described materials alone or two or more of them in combination.

The positive electrode active material layer 21 may contain a conductive additive to improve conductivity. As the conductive additive, for example, the same material as the material used in the negative electrode active material layer 11 can be used.

The positive electrode active material layer 21 may contain a solid electrolyte in order to improve lithium ion conductivity. As the solid electrolyte, one capable of conducting lithium ions may be used. For example, at least one selected from a group consisting of inorganic solid electrolytes such as perovskite-type compounds such as $La_{0.51}Li_{0.34}TiO_{2.94}$ and $La_{0.5}Li_{0.5}TiO_3$, lithicon-type compounds such as $Li_{14}Zn(GeO_4)_4$, garnet-type compounds such as $Li_7La_3Zr_2O_{12}$, nasicon-type compounds such as $Li_{1.3}Al_{0.3}Ti_{1.7}(PO_4)_3$ and $Li_{1.5}Al_{0.5}Ge_{1.5}(PO_4)_3$, thiolysicon-type compounds such as $Li_{3.25}Ge_{0.25}P_{0.75}S_4$ and $Li_3PS_4$, glass compounds such as $Li_4SiO_{4.50}Li_3BO_3$, $Li_2S$—$P_2S_5$, and $Li_2O$—$Li_3O_5$—$SiO_2$, phosphoric acid compounds such as $Li_3PO_4$, $Li_{3.5}Si_{0.5}P_{0.5}O_4$ and $Li_{2.9}PO_{3.3}N_{0.46}$, amorphous such as $Li_{2.9}PO_{3.3}N_{0.46}$ (LIPON) and $Li_{3.6}Si_{0.6}P_{0.4}O_4$, glass ceramics such as $Li_{1.07}Al_{0.69}Ti_{1.46}(PO_4)_3$ and $Li_{1.5}Al_{0.5}Ge_{1.5}(PO_4)_3$, and lithium-containing salt, polymer-based solid electrolytes such as polyethylene oxide, gel-based solid electrolytes containing lithium-containing salts or lithium ion conductive ionic liquids, and the like can be used.

The positive electrode active material layer 21 may contain a binder having a role of binding the positive electrode active materials to each other and binding the positive electrode active material and the positive electrode current collector layer 22 to each other. As the binder, for example, the same material as the material used in the negative electrode active material layer 11 can be used.

The solid electrolyte sheet 30 includes a porous base material and a solid electrolyte held by the porous base material. The solid electrolyte sheet 30 with the porous base material has good mechanical strength. For this reason, since the solid electrolyte sheet 30 with the porous base material is provided, it is preferable in that the cracking and/or chipping of the negative electrode piece 13 and the positive electrode piece 23 can be effectively prevented in the step of press-molding and pressing the wound electrode laminated sheet 40 to be described later.

The form of the porous base material forming the solid electrolyte sheet 30 is not particularly limited, and examples thereof include a woven fabric, a nonwoven fabric, a mesh cloth, a porous membrane, an expanded sheet, and a punching sheet. Among these forms, a nonwoven fabric is preferable from the viewpoint of the holding force and the handleability of the solid electrolyte.

The porous base material is preferably formed of an insulating material. Accordingly, the solid electrolyte sheet 30 with good insulation properties is provided. As the insulating material, for example, resin materials such as nylon, polyester, polyethylene, polypropylene, polytetrafluoroethylene, ethylene-tetrafluoroethylene copolymer, polyvinylidene fluoride, polyvinylidene chloride, polyvinyl chloride, polyurethane, vinylon, polybenzimidazole, polyimide, polyphenylene sulfide, polyetheretherketone, cellulose, and acrylic resin; natural fibers such as hemp, wood pulp, and cotton linter, and glass are exemplary examples.

As the solid electrolyte of the solid electrolyte sheet 30, one having ion conductivity and insulation properties may be used and a known solid electrolyte applicable as the solid electrolyte of the solid-state lithium-ion battery can be used. Specifically, as the solid electrolyte, inorganic solid electrolytes such as sulfide solid electrolyte materials, oxide solid electrolyte materials, and lithium-containing salt, polymer-based solid electrolytes such as polyethylene oxide, and gel-based solid electrolytes containing lithium-containing salts or lithium-ion conductive ionic liquids are exemplary examples.

The form of the solid electrolyte is not particularly limited and examples thereof include a particulate form.

The solid electrolyte sheet 30 may contain an adhesive in order to provide mechanical strength and/or flexibility. Known adhesives can be used as the adhesive.

As the solid electrolyte sheet 30, one that does not contain a porous base material may be used As such a solid electrolyte sheet, for example, a material composed of a solid electrolyte and a binder may be used. As the binder, for example, the same material as the material used for the negative electrode active material layer 11 can be used.

[Solid State Battery Manufacturing Method]

Next, a method of manufacturing the solid state battery 100 of this embodiment shown in FIGS. 1 to 3 will be described as an example of the solid state battery manufacturing method of the present invention.

Figure 7:
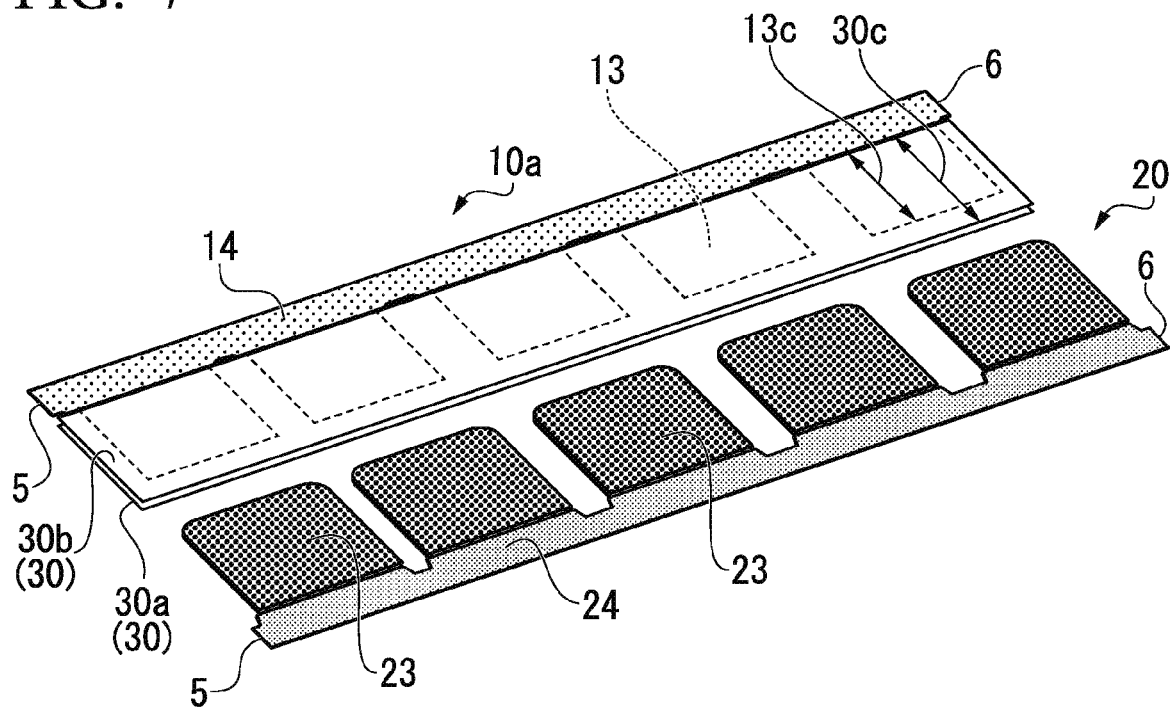
FIG. 7 is a perspective view showing an example of the solid state battery manufacturing method of the first embodiment.
Figure 8:
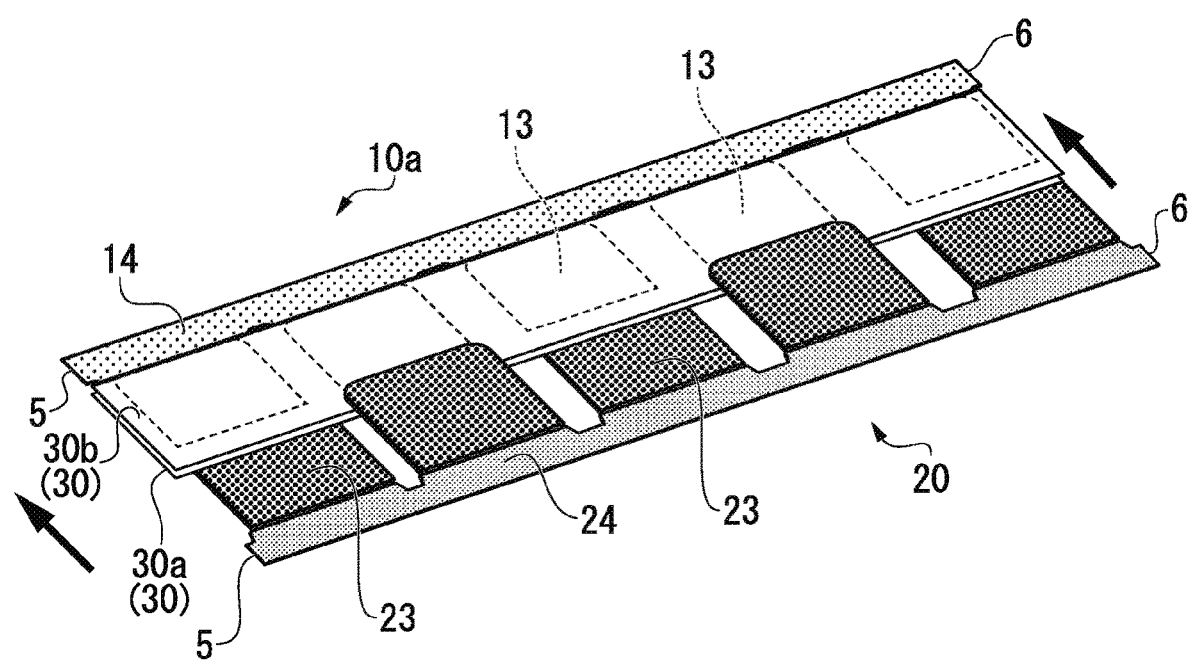
FIG. 8 is a perspective view showing an example of the solid state battery manufacturing method of the first embodiment.

FIGS. 7 and 8 are perspective views showing an example of a solid state battery manufacturing method of this embodiment.

"Manufacturing of Negative Electrode Sheet 10"

In the method of manufacturing the solid state battery 100 of this embodiment, first, the negative electrode sheet 10 shown in FIG. 6 is manufactured.

Specifically, for example, a negative electrode mixture is prepared by mixing a negative electrode active material, a solid electrolyte, a conductive additive, and a binder. Next, a negative electrode mixture slurry is prepared by dispersing the negative electrode mixture in a predetermined solvent. Next, the negative electrode mixture slurry is applied to a predetermined position of both surfaces of a negative electrode current collector, the solvent in the negative electrode mixture slurry is removed, and a resultant is compressed by a roll pressing machine or the like. Accordingly, a negative electrode active material layer is formed on both surfaces of the negative electrode current collector. Then, it is possible to obtain the comb-shaped negative electrode sheet 10 shown in FIG. 6 which includes the negative electrode connection portion 14 formed by the negative electrode current collector layer 12 and extending in a belt shape and the plurality of negative electrode pieces 13 connected to the side surface of the negative electrode connection portion 14, having the negative electrode active material layer 11 formed on the negative electrode current collector layer 12, and having a rectangular shape in a plan view and in which a gap between the adjacent negative electrode pieces 13 becomes wider gradually from the first end 5 toward the second end 6 by punching the negative electrode current collector having the negative electrode active material layer formed on both surfaces thereof.

"Manufacturing of Positive Electrode Sheet 20"

Next, in a method of manufacturing the solid state battery 100 of this embodiment, the positive electrode sheet 20 shown in FIG. 6 is manufactured.

Specifically, for example, a positive electrode mixture is prepared by mixing a positive electrode active material, a solid electrolyte, a conductive additive, and a binder. Next, a positive electrode mixture slurry is prepared by dispersing the positive electrode mixture in a predetermined solvent. Next, the positive electrode mixture slurry is applied to a predetermined position of both surfaces of a positive electrode current collector, the solvent in the positive electrode mixture slurry is removed, and a resultant is compressed by a roll pressing machine or the like. Accordingly, a positive electrode active material layer is formed on both surfaces of the positive electrode current collector. Then, it is possible to obtain the comb-shaped positive electrode sheet 20 shown in FIG. 6 which includes the positive electrode connection portion 24 formed by the positive electrode current collector layer 22 and extending in a belt shape and the plurality of positive electrode pieces 23 connected to the side surface of the positive electrode connection portion 24, having the positive electrode active material layer 21 formed on the positive electrode current collector layer 22, and having a rectangular shape in a plan view and in which the gap between the adjacent positive electrode pieces 23 becomes wider gradually from the first end 5 toward the second end 6 by punching the positive electrode current collector having the positive electrode active material layer formed on both surfaces thereof.

As shown in FIG. 6, the negative electrode sheet 10 and the positive electrode sheet 20 used in the manufacturing method of this embodiment have the same comb shape. Thus, the width 13c of the negative electrode piece 13 of the negative electrode sheet 10 is the same as the width 23c of the positive electrode piece 23 of the positive electrode sheet 20.

For this reason, in the step of press-molding the wound electrode laminated sheet 40 to be described later and pressing the wound electrode laminated sheet, the wound electrode laminated sheet 40 can be press-molded with a uniform surface pressure. As a result, since it is possible to prevent the cracking and/or chipping of the negative electrode piece 13 and the positive electrode piece 23 due to the process of press-molding the wound electrode laminated sheet 40, it is possible to manufacture the solid state battery 100 with good yield. Further, the solid state battery 100 having good initial performance is obtained.

"Manufacturing of Electrode Sheet 40"

Next, in a method of manufacturing the solid state battery 100 of this embodiment, the electrode laminated sheet 40 shown in FIG. 4 is manufactured.

First, the solid electrolyte sheet 30 is prepared. Specifically, a solid electrolyte slurry is prepared by dispersing a solid electrolyte in a predetermined solvent. Then, the solid electrolyte slurry is applied to an entire porous base material, the solvent in the solid electrolyte slurry is removed, and a resultant is compressed by a roll pressing machine or the like. Accordingly, the solid electrolyte sheet 30 is obtained.

Further, when a solid electrolyte sheet composed of a solid electrolyte and a binder is used as the solid electrolyte sheet 30, for example, the solid electrolyte sheet can be manufactured by the following method.

First, a solid electrolyte slurry is prepared by dispersing a solid electrolyte and a binder in a predetermined solvent.

Next, the solid electrolyte slurry is applied to a release film formed of polyethylene terephthalate (PET) or the like and the solvent in the solid electrolyte slurry is removed so as to form a coating film. Then, if necessary, the coating film is densified by a method of rolling the release film having the coating film and is peeled off from the release film. Accordingly, the solid electrolyte sheet composed of the solid electrolyte and the binder is obtained.

Next, the first solid electrolyte sheet 30a having the width 30c equal to or larger than the width 13c of the negative electrode piece 13 and having a belt shape and the second solid electrolyte sheet 30b having the width 30c equal to or larger than the width 13c of the negative electrode piece 13 and having a belt shape are cut out from the solid electrolyte sheet 30.

Next, as shown in FIG. 7, the first solid electrolyte sheet 30a and the second solid electrolyte sheet 30b are laminated on both surfaces of the negative electrode sheet 10 so as to sandwich the negative electrode piece 13 so that a laminated sheet 10a is formed.

When a solid electrolyte sheet composed of a solid electrolyte and a binder is used as the solid electrolyte sheet 30, the first solid electrolyte sheet 30a and the second solid electrolyte sheet 30b may be laminated so as to sandwich the negative electrode piece 13 according to the following method.

First, a solid electrolyte slurry is prepared by dispersing a solid electrolyte and a binder in a predetermined solvent.

Next, the solid electrolyte slurry is applied to a release film formed of polyethylene terephthalate (PET) or the like and the solvent in the solid electrolyte slurry is removed so as to form a coating film. Then, the release film having the coating film is disposed on each of both surfaces of a region excluding the negative electrode connection portion 14 of the negative electrode sheet 10 shown in FIG. 6 so that the coating film and the negative electrode piece 13 face each other, thereby forming a laminated body. Next, the coating film is densified by a method of rolling the laminated body and the release film is peeled off. Accordingly, the coating film is transferred to the negative electrode piece 13 and a solid electrolyte sheet composed of a solid electrolyte and a binder is laminated so as to sandwich the negative electrode piece 13. Then, an extra solid electrolyte sheet in the periphery of the negative electrode sheet 10 is cut. With the above-described steps, the laminated sheet 10a in which the first solid electrolyte sheet 30a and the second solid electrolyte sheet 30b are laminated on both surfaces of the negative electrode sheet 10 so as to sandwich the negative electrode piece 13 is formed.

Further, the laminated sheet 10a in which the first solid electrolyte sheet 30a and the second solid electrolyte sheet 30b are laminated on both surfaces of the negative electrode sheet 10 so as to sandwich the negative electrode piece 13 may be formed by a method in which the solid electrolyte slurry is applied to each of both surfaces of a region excluding the negative electrode connection portion 14 in the negative electrode sheet 10 shown in FIG. 6 and the solvent in the solid electrolyte slurry is removed so as to form the solid electrolyte film.

Next, as shown in FIG. 7, the laminated sheet 10a in which the first solid electrolyte sheet 30a and the second solid electrolyte sheet 30b are respectively disposed on both surfaces of the negative electrode sheet 10 and the positive electrode sheet 20 are disposed so as to face each other in a plan view while the negative electrode connection portion 14 of the negative electrode sheet 10 and the positive electrode connection portion 24 of the positive electrode sheet 20 face outward.

Next, as shown in FIG. 8, the laminated sheet 10a is disposed so as to sew between the adjacent positive electrode pieces 23 of the positive electrode sheet 20 while the negative electrode connection portion 14 faces the positive electrode connection portion 24 in a plan view. Accordingly, as shown in FIGS. 4 and 5, the electrode laminated sheet 40 is formed such that the first region 45 in which the first solid electrolyte sheet 30a, the negative electrode piece 13, the second solid electrolyte sheet 30b, and the positive electrode piece 23 are laminated in this order and the second region 44 in which the positive electrode piece 23, the first solid electrolyte sheet 30a, the negative electrode piece 13, and the second solid electrolyte sheet 30b are laminated in this order are alternately formed in the longitudinal direction between the negative electrode connection portion 14 and the positive electrode connection portion 24 and the gap between the first region 45 and the second region 44 which are adjacent to each other becomes wider gradually from the first end 5 toward the second end 6.

Next, the electrode laminated sheet 40 shown in FIGS. 4 and 5 is wound around the first end 5 in a flat shape. Accordingly, as shown in FIGS. 2 and 3, the negative electrode piece 13 and the positive electrode piece 23 are alternately laminated so as to overlap each other with the solid electrolyte sheet 30 interposed therebetween in a plan view.

Then, the wound electrode laminated sheet 40 is preferably pressed in the laminating direction of the negative electrode piece 13, the positive electrode piece 23, and the solid electrolyte sheet 30 by, for example, press-molding.

Subsequently, the negative electrode connection portion 14 is electrically connected to an external electrode (not shown). Further, the positive electrode connection portion 24 is electrically connected to an external electrode (not shown).

Then, if necessary, a protection layer (not shown) is formed on the uppermost layer and/or the lowermost layer of the wound electrode laminated sheet 40 and is accommodated in an exterior material (not shown) such as a film in a sealed state.

With the above-described steps, the solid state battery 100 of this embodiment shown in FIGS. 1 to 3 can be obtained.

The solid state battery 100 of this embodiment includes a flat laminated structure obtained by winding the electrode laminated sheet 40 shown in FIGS. 4 and 5. For this reason, as shown in FIGS. 1 to 3, the negative electrode active material layer 11 and the positive electrode active material layer 21 exist only in the flat portion 7 to which a pressure during a press-molding process and a constraint pressure in a use state are mainly applied and the negative electrode active material layer 11 and the positive electrode active material layer 21 do not exist in the curved portion 8.

Thus, in the solid state battery 100 of this embodiment, the negative electrode active material layer 11 and/or the positive electrode active material layer 21 are not easily cracked and/or chipped even when a pressure during a press-molding process and a constraint pressure in a use state are applied as compared with the conventional solid state battery in which the first electrode active material layer and/or the second electrode active material layer are disposed in the curved portion in a curved state. Thus, the solid state battery 100 of this embodiment can be manufactured with a good yield and can have a long lifespan as compared with the case of the conventional solid state battery in which the first electrode active material layer and/or the second electrode active material layer are disposed in the curved portion in a curved state.

Further, in the solid state battery 100 of this embodiment, the negative electrode active material layer 11 and the positive electrode active material layer 21 exist only in the flat portion 7 to which a constraint pressure in a use state is mainly applied. Thus, a variation in initial performance of the solid state battery 100 of this embodiment is determined by a difference in the battery performance in the flat portion 7. Thus, the solid state battery 100 of this embodiment has a little variation in initial performance as compared with the conventional solid state battery in which the first electrode active material layer and/or the second electrode active material layer are disposed in the curved portion in a curved state.

Further, since the solid state battery 100 of this embodiment includes a flat laminated structure obtained by winding the electrode laminated sheet 40, the solid state battery can be manufactured by a simple method of winding the electrode laminated sheet 40 and hence productivity is excellent.

Further, in the solid state battery 100 of this embodiment, since the negative electrode active material layer 11 and/or the positive electrode active material layer 21 are not easily cracked and/or chipped even when a constraint pressure in a use state is applied, it is possible to improve the performance by increasing the constraint pressure.

Further, in the solid state battery 100 of this embodiment, since the negative electrode active material layer 11 and the positive electrode active material layer 21 do not exist in the curved portion 8, it is possible to decrease the curvature radius and to shorten the length of the solid electrolyte sheet 30 of the electrode laminated sheet 40 existing in the curved portion 8, the negative electrode connection portion 14 formed by the negative electrode current collector layer 12, and the positive electrode connection portion 24 formed by the positive electrode current collector layer 22 as compared with the conventional solid state battery in which the first electrode active material layer and/or the second electrode active material layer are also disposed in the curved portion. As a result, in the solid state battery 100 of this embodiment, since it is possible to decrease the ratio of the volume of the curved portion 8 in the volume of the solid state battery 100 as compared with the conventional solid state battery in which the first electrode active material layer and/or the second electrode active material layer are disposed in the curved portion, it is possible to obtain high energy density.

According to the method of manufacturing the solid state battery 100 of this embodiment, it is possible to easily and efficiently manufacture the solid state battery 100 of this embodiment by a simple method of winding the electrode laminated sheet 40 around the first end 5 in a flat shape.

Second Embodiment

Figure 9:
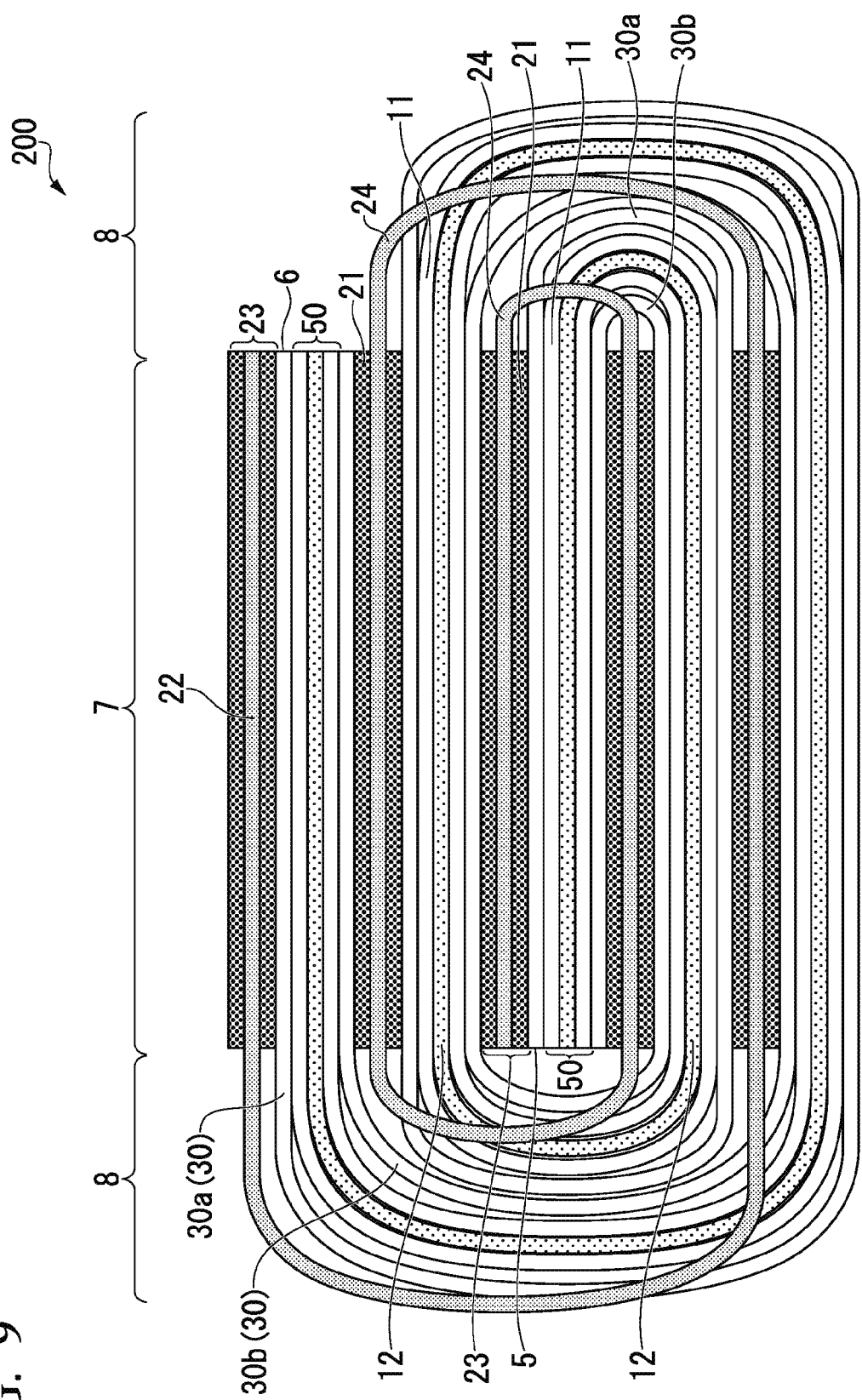
FIG. 9 is a side view showing a solid state battery of a second embodiment of the present invention.
Figure 10:
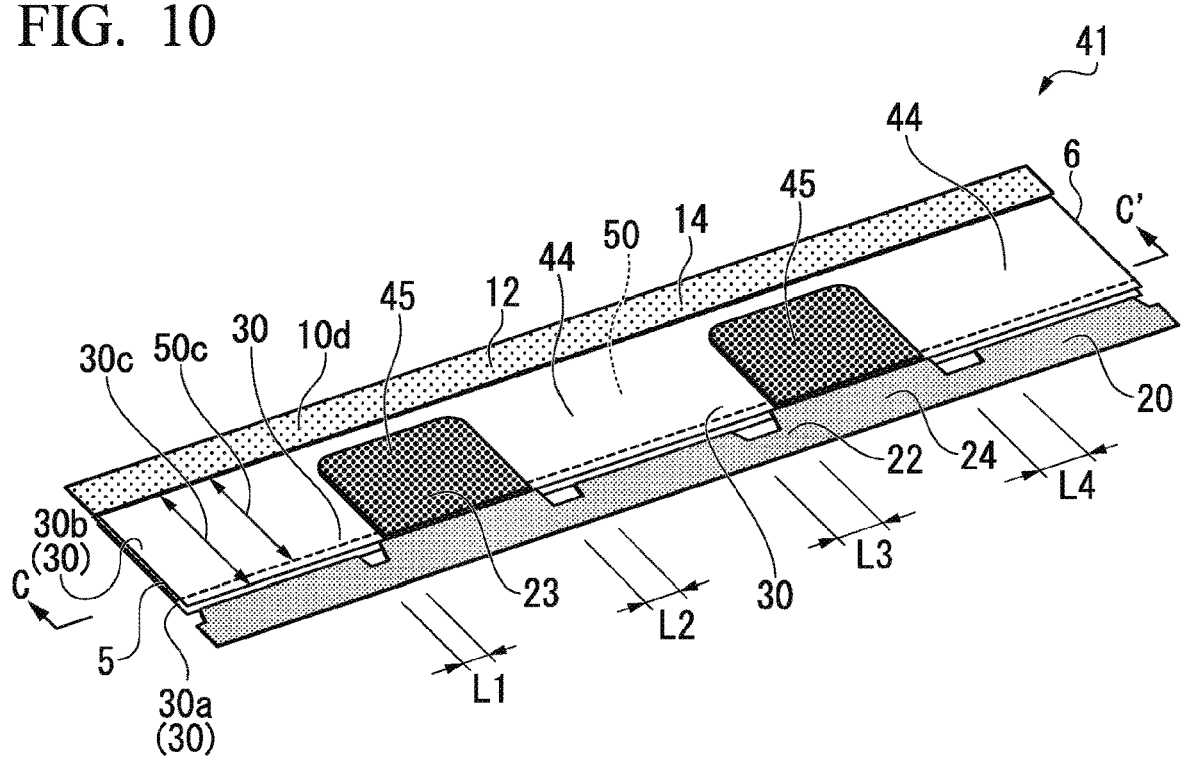
FIG. 10 is a perspective view of an electrode laminated sheet of the solid state battery of the second embodiment.
Figure 11:
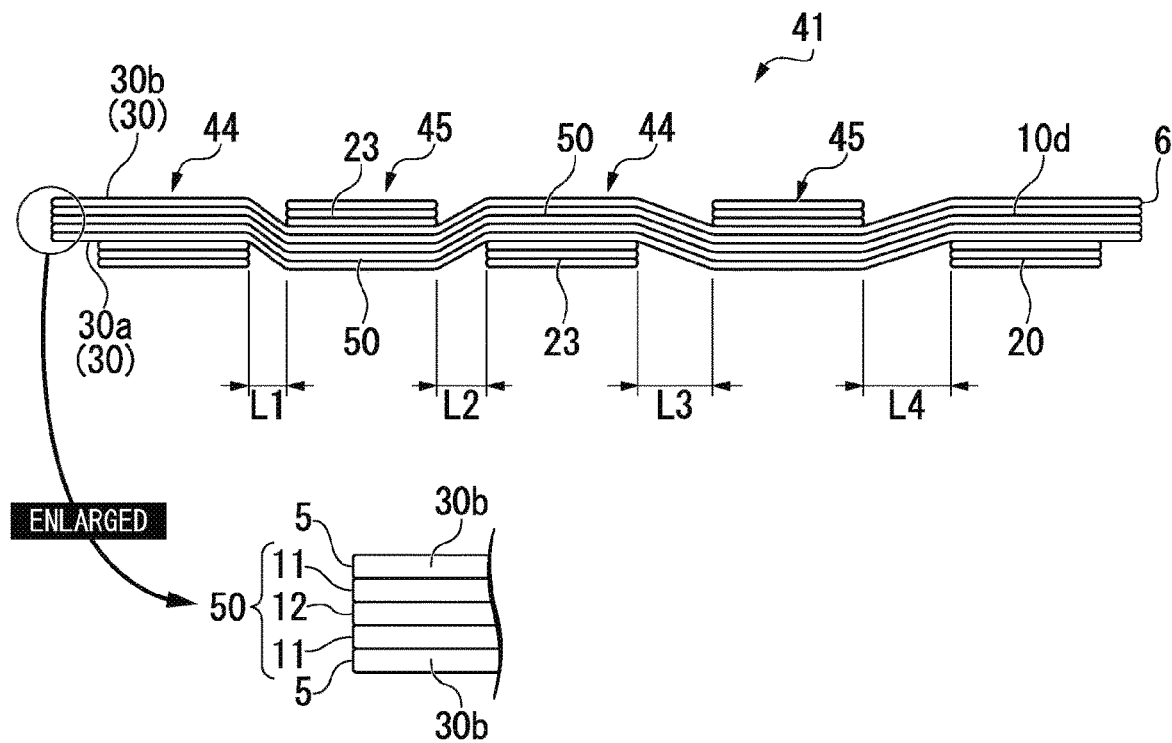
FIG. 11 is a cross-sectional view taken along a line C-C' of the electrode laminated sheet shown in FIG. 10.

FIG. 9 is a side view showing a solid state battery of a second embodiment of the present invention. FIG. 10 is a perspective view of an electrode laminated sheet of the solid state battery of the second embodiment. FIG. 11 is a cross-sectional view taken along a line C-C' of the electrode laminated sheet shown in FIG. 10.

A solid state battery 200 of the second embodiment shown in FIGS. 9 to 11 is a solid-state lithium ion secondary battery having a flat laminated structure (see FIG. 9) which is obtained by winding an electrode laminated sheet 41 shown in FIGS. 10 and 11.

In the solid state battery 200 of this embodiment, charging and discharging are performed by exchanging lithium ions through a solid electrolyte layer between the negative electrode active material layer 11 of the negative electrode 50 and the positive electrode active material layer 21 of the positive electrode piece 23.

The solid state battery 200 of the second embodiment shown in FIGS. 9 to 11 is different from the solid state battery 100 of the first embodiment shown in FIGS. 1 to 5 only in the shape of the negative electrode 50 (corresponding to a "first electrode" of claims).

Specifically, in the solid state battery 100 of the first embodiment, the first electrode in which the first electrode active material layer is formed on the first current collector layer is formed as a plurality of first electrode pieces having the same shape as that of the second electrode piece.

In contrast, in the solid state battery 200 of the second embodiment, as shown in FIGS. 9 to 11, the first electrode (the negative electrode 50) is formed in a belt shape in which the first electrode active material layer (the negative electrode active material layer 11) is formed on the first current collector layer (the negative electrode current collector layer 12).

In the solid state battery 200 of the second embodiment shown in FIGS. 9 to 11, the same reference numerals will be given to the same components as those of the solid state battery 100 of the first embodiment and a description thereof will be omitted.

The electrode laminated sheet 41 includes the negative electrode 50 which extends in a belt shape as shown in FIGS. 10 and 11. The negative electrode 50 is formed such that the negative electrode active material layer 11 is formed on both surfaces of the negative electrode current collector layer 12. As shown in FIG. 10, the negative electrode 50 includes the negative electrode connection portion 14 which is a region without the negative electrode active material layer 11 on the negative electrode current collector layer 12 and extends in a belt shape. The negative electrode connection portion 14 functions as a negative electrode drawn electrode and is electrically connected to an external electrode (not shown).

In the electrode laminated sheet 41, as shown in FIG. 10, a negative electrode sheet 10d and the positive electrode sheet 20 are disposed so that the negative electrode connection portion 14 and the positive electrode connection portion 24 face each other in a plan view.

The first region 45 in which the first solid electrolyte sheet 30a, the negative electrode 50, the second solid electrolyte sheet 30b, and the positive electrode piece 23 are laminated in this order from below in FIG. 11 and the second region 44 in which the positive electrode piece 23, the first solid electrolyte sheet 30a, the negative electrode 50, and the second solid electrolyte sheet 30b are laminated in this order from below in FIG. 11 are alternately formed in the longitudinal direction between the negative electrode connection portion 14 and the positive electrode connection portion 24.

In the electrode laminated sheet 41, as shown in FIGS. 10 and 11, the gaps L1, L2, L3, and L4 between the first region 45 and the second region 44 which are adjacent to each other become wider gradually from the first end 5 toward the second end 6 (L1<L2<L3<L4).

(Solid State Battery Manufacturing Method)

Figure 12:
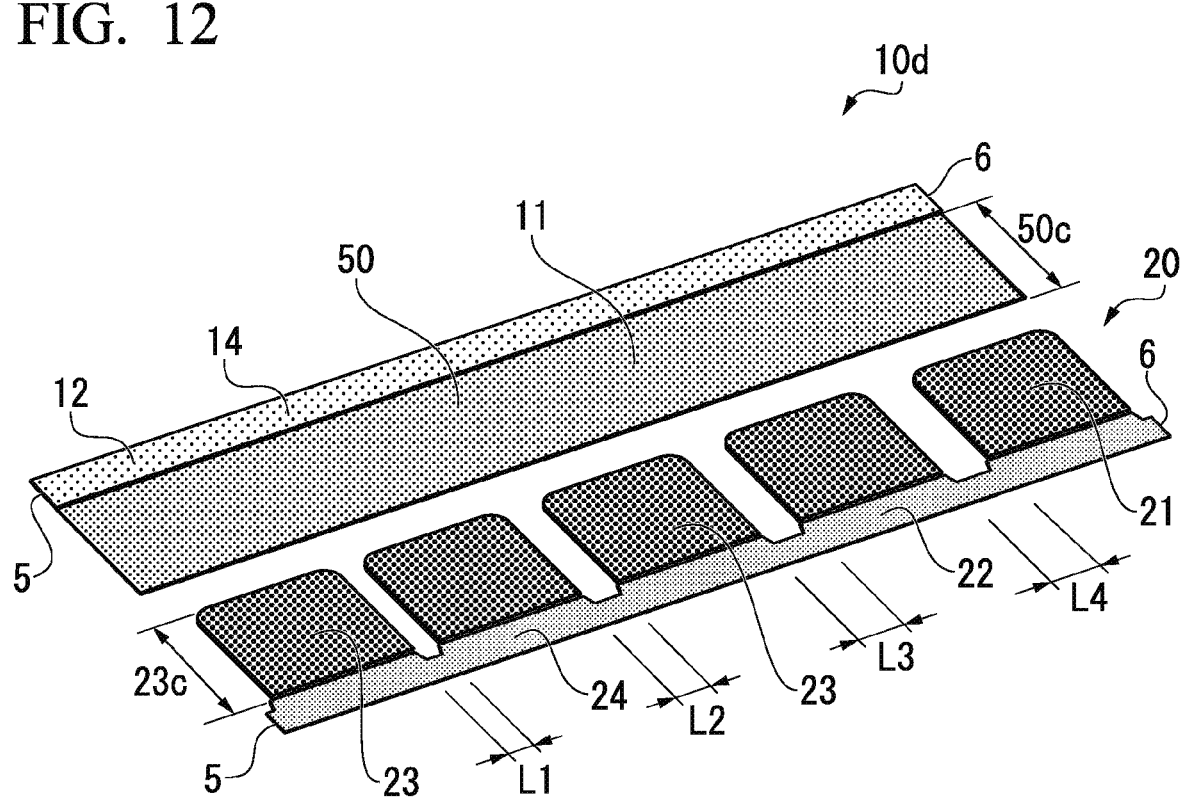
FIG. 12 is a perspective view showing an example of a positive electrode sheet and a negative electrode sheet used in a solid state battery manufacturing method of the second embodiment.

Next, an example of a method of manufacturing the solid state battery 200 of the second embodiment shown in FIGS. 9 to 11 will be described. FIG. 12 is a perspective view showing an example of the negative electrode sheet and the positive electrode sheet used in the solid state battery manufacturing method of the second embodiment.

Figure 13:
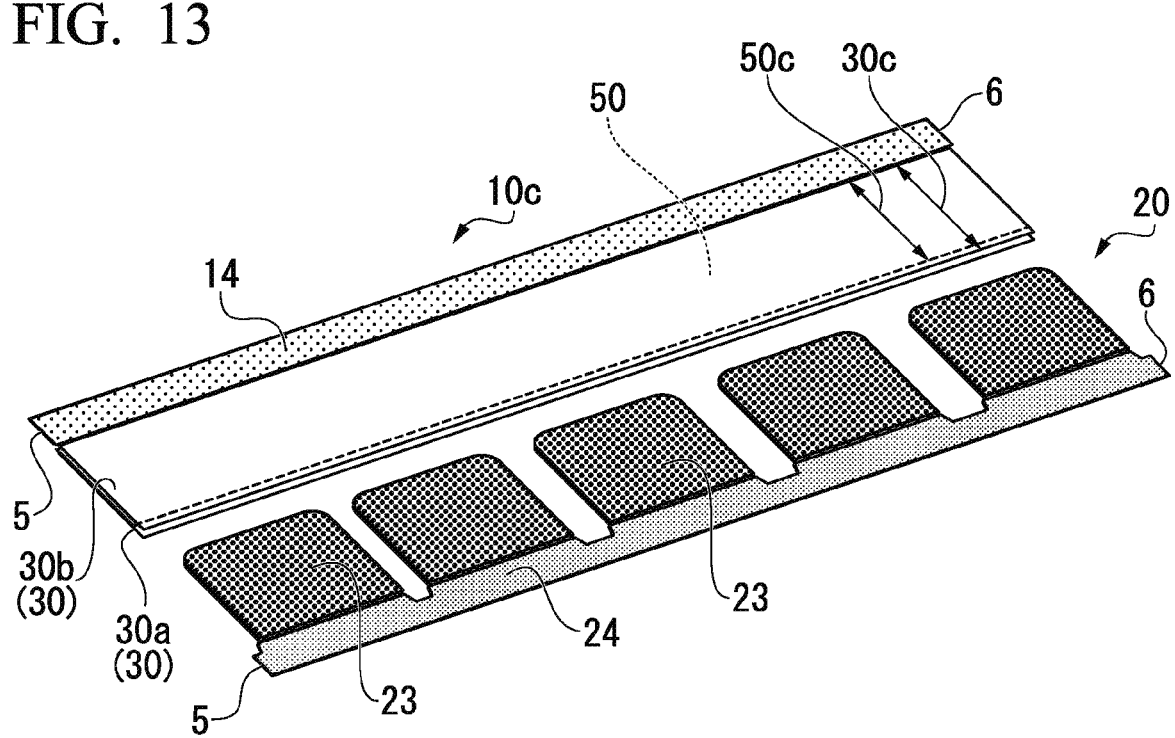
FIG. 13 is a perspective view showing an example of the solid state battery manufacturing method of the second embodiment.
Figure 14:
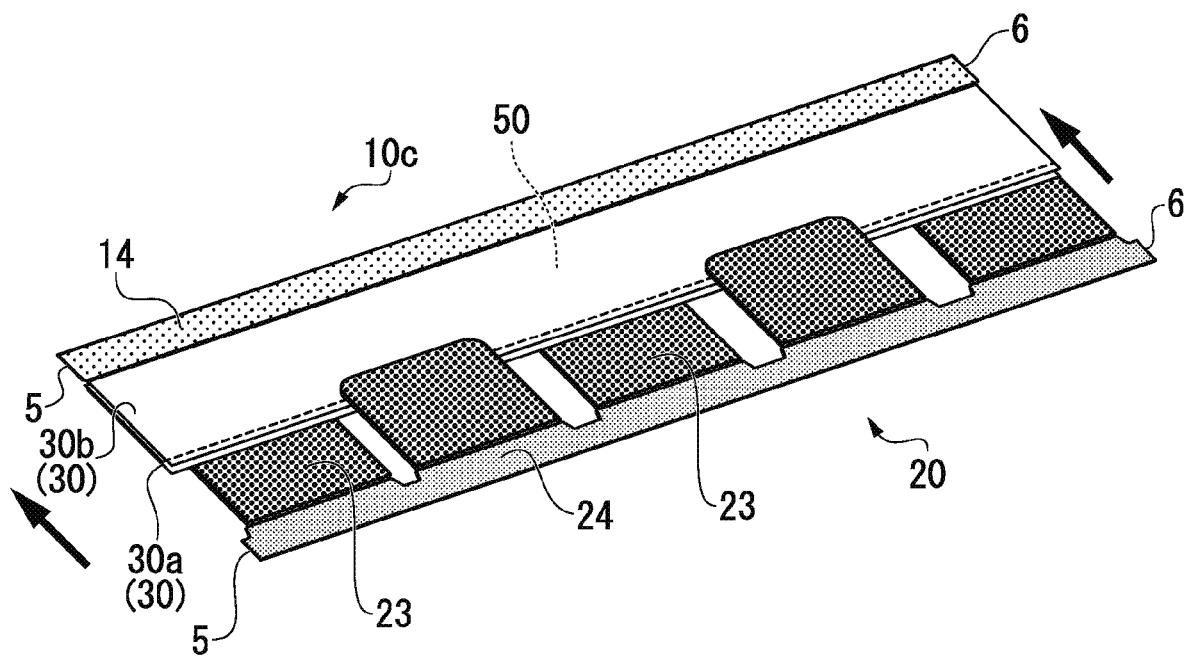
FIG. 14 is a perspective view showing an example of the solid state battery manufacturing method of the second embodiment.

FIGS. 13 and 14 are perspective views showing an example of a method of manufacturing the solid state battery 200 of the second embodiment.

"Manufacturing of Negative Electrode Sheet 10d"

In a method of manufacturing the solid state battery 200 of this embodiment, the negative electrode sheet 10d with the negative electrode 50 is manufactured.

When manufacturing the negative electrode sheet 10d, first, a negative electrode mixture slurry is prepared similarly to the case of manufacturing the negative electrode sheet 10 used in the solid state battery 100 of the first embodiment. Next, the negative electrode mixture slurry is applied to a predetermined position of both surfaces of a negative electrode current collector, a solvent is removed, and a resultant is compressed by a roll pressing machine or the like. Accordingly, the negative electrode sheet 10d including the negative electrode connection portion 14 which is formed by the negative electrode current collector layer 12 and extends in a belt shape and the negative electrode 50 which has the negative electrode active material layer 11 formed on both surfaces of the negative electrode current collector layer 12 can be obtained (see FIG. 12).

Next, the solid electrolyte sheet 30 is prepared similarly to the case of manufacturing the solid state battery 100 of the first embodiment and the first solid electrolyte sheet 30a having the width 30c equal to or larger than the width 50c of the negative electrode 50 and having a belt shape and the second solid electrolyte sheet 30b having the width 30c equal to or larger than the width 50c of the negative electrode 50 and extending in a belt shape are cut out from the solid electrolyte sheet 30.

Next, as shown in FIG. 13, the first solid electrolyte sheet 30a and the second solid electrolyte sheet 30b are laminated on both surfaces of the negative electrode sheet 10d so as to sandwich the negative electrode 50 so that a laminated sheet 10c is formed.

Next, as shown in FIG. 13, the laminated sheet 10c in which the first solid electrolyte sheet 30a and the second solid electrolyte sheet 30b are respectively disposed on both surfaces of the negative electrode sheet 10d and the positive electrode sheet 20 are disposed so as to face each other in a plan view while the negative electrode connection portion 14 of the negative electrode sheet 10d and the positive electrode connection portion 24 of the positive electrode sheet 20 face outward.

Next, as shown in FIG. 14, the laminated sheet 10d is disposed so as to sew between the adjacent positive electrode pieces 23 of the positive electrode sheet 20 while the negative electrode connection portion 14 and the positive electrode connection portion 24 face each other in a plan view.

Accordingly, as shown in FIGS. 10 and 11, the electrode laminated sheet 41 is formed such that the first region 45 in which the first solid electrolyte sheet 30a, the negative electrode 50, the second solid electrolyte sheet 30b, and the positive electrode piece 23 are laminated in this order and the second region 44 in which the positive electrode piece 23, the first solid electrolyte sheet 30a, the negative electrode 50, and the second solid electrolyte sheet 30b are laminated in this order are alternately formed in the longitudinal direction between the negative electrode connection portion 14 and the positive electrode connection portion 24 and the gap between the first region 45 and the second region 44 which are adjacent to each other becomes wider gradually from the first end 5 toward the second end 6.

Next, the electrode laminated sheet 41 shown in FIGS. 10 and 11 is wound around the first end 5 in a flat shape. Accordingly, as shown in FIG. 9, the negative electrode 50 and the positive electrode piece 23 are alternately laminated in a plan view so as to overlap each other with the solid electrolyte sheet 30 interposed therebetween.

Then, the wound electrode laminated sheet 41 is preferably pressed in the laminating direction of the negative electrode 50, the positive electrode piece 23, and the solid electrolyte sheet 30 by, for example, press-molding.

Subsequently, the negative electrode connection portion 14 is electrically connected to an external electrode (not shown). Further, the positive electrode connection portion 24 is electrically connected to an external electrode (not shown).

Then, if necessary, a protection layer (not shown) is formed on the uppermost layer and/or the lowermost layer of the wound electrode laminated sheet 41 and is accommodated in an exterior material (not shown) such as a film in a sealed state.

With the above-described steps, the solid state battery 200 of this embodiment shown in FIGS. 9 to 11 can be obtained.

Since the solid state battery 200 of this embodiment includes a flat laminated structure obtained by winding the electrode laminated sheet 41, the positive electrode active material layer 21 exists only in the flat portion 7 to which a pressure during a press-molding process and a constraint pressure in a use state are mainly applied and the positive electrode active material layer 21 does not exist in the curved portion 8 corresponding to the region excluding the flat portion 7. Thus, in the solid state battery 200 of this embodiment, the positive electrode active material layer 21 is not easily cracked and/or chipped even when a pressure during a press-molding process and a constraint pressure in a use state are applied as compared with the conventional solid state battery in which the negative electrode active material layer 11 and the positive electrode active material layer 21 are disposed in the curved portion 8 in a curved state. Thus, the solid state battery 200 of this embodiment can be manufactured with a good yield and can have a long lifespan as compared with the case of the conventional solid state battery in which the negative electrode active material layer 11 and the positive electrode active material layer 21 are disposed in the curved portion in a curved state.

Further, in the solid state battery 200 of the present invention, the positive electrode active material layer 21 exists only in the flat portion 7 to which a constraint pressure in a use state is mainly applied. Thus, a variation in initial performance of the solid state battery 200 of this embodiment is determined by a difference in the battery performance in the flat portion 7.

Thus, the solid state battery 200 of this embodiment has a little variation in initial performance as compared with the conventional solid state battery in which the negative electrode active material layer 11 and the positive electrode active material layer 21 are disposed in the curved portion 8 in a curved state.

Other Examples

As described above, the embodiments of the present invention have been described in detail. However, the present invention is not limited to the above-described embodiments and various modifications and changes can be made within the scope of the spirit of the present invention described in the appended claims.

For example, in the solid state batteries 100 and 200 of the above-described embodiments, a case in which the solid electrolyte sheet 30 has two sheets of the first solid electrolyte sheet 30a and the second solid electrolyte sheet 30b has been described as an example, but instead of the first solid electrolyte sheet 30a and the second solid electrolyte sheet 30b, one integrated solid electrolyte sheet bonded along a side surface on the side opposite to the negative electrode connection portion 14 in the negative electrode sheet 10 may be used. Further, the solid electrolyte sheet 30 may be a single solid electrolyte sheet which is disposed so as to be folded back along the edge on the side opposite to the negative electrode connection portion 14 in the negative electrode sheet 10.

Figure 15:
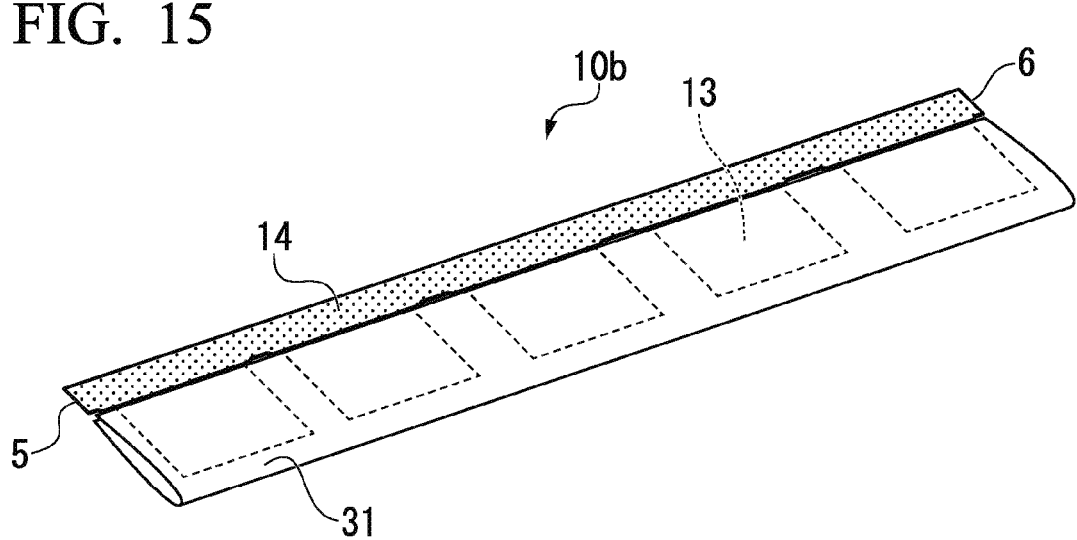
FIG. 15 is a perspective view showing another example of the laminated sheet used when manufacturing the solid state battery of the present invention.

When manufacturing the solid state battery in which a single solid electrolyte sheet is used as the solid electrolyte sheet 30, a laminated sheet 10b shown in FIG. 15 may be used instead of, for example, the laminated sheet 10a in which the first solid electrolyte sheet 30a and the second solid electrolyte sheet 30b are respectively disposed on both surfaces of the negative electrode sheet 10 shown in FIG. 7. The laminated sheet 10b shown in FIG. 15 is different from the laminated sheet 10a shown in FIG. 7 only in the solid electrolyte sheet. In the laminated sheet 10b shown in FIG. 15, a single solid electrolyte sheet 31 is disposed so as to be folded back along the edge on the side opposite to the negative electrode connection portion 14 in the negative electrode sheet 10.

In the solid state battery in which a single solid electrolyte sheet 31 is used as the solid electrolyte sheet 30, even when the negative electrode active material layer 11 of the negative electrode piece 13 is cracked or chipped, fragments generated by the cracking or chipping tend to stay in the solid electrolyte sheet 31 while being sandwiched. Accordingly, it is preferable in that short-circuiting between the negative electrode piece 13 and the positive electrode piece 23 hardly occurs.

Further, the first sheet of the solid state battery of the present invention may include the first connection portion which is formed by the first current collector layer and extends in a belt shape and the first electrode in which the first electrode active material layer is formed on the first current collector layer. For example, instead of the negative electrode sheet 10 shown in FIG. 6, a negative electrode sheet 10e (a first sheet) shown in FIG. 16 may be used.

Figure 16:
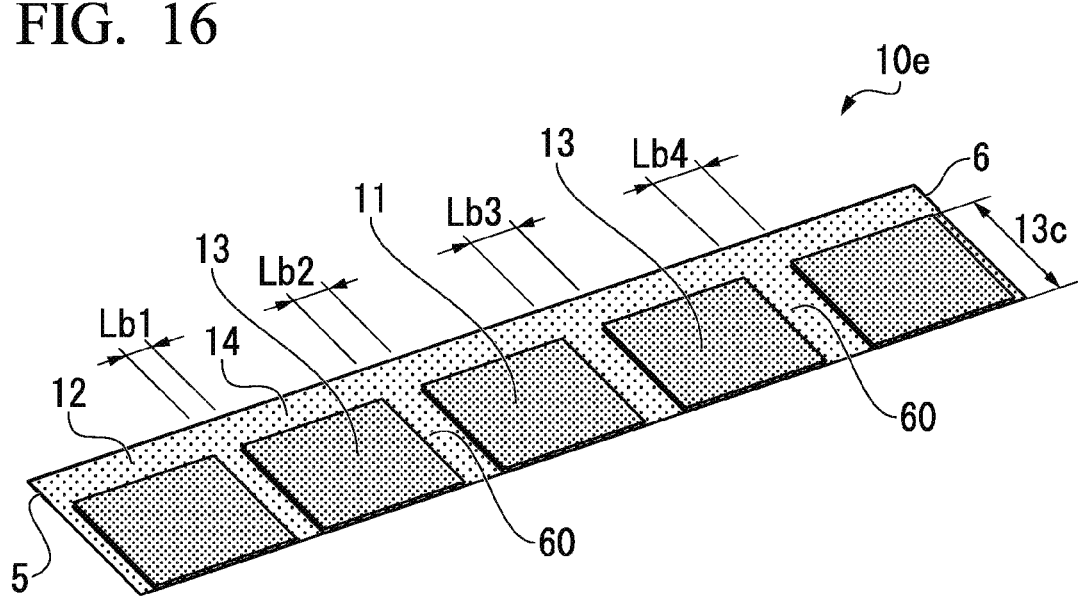
FIG. 16 is a perspective view showing another example of a first sheet included in the solid state battery of the present invention.

The negative electrode sheet 10e shown in FIG. 16 includes the negative electrode connection portion 14 (the first connection portion), the plurality of negative electrode pieces 13 (the first electrode pieces) which have the negative electrode active material layer 11 (the first electrode active material layer) formed on the negative electrode current collector layer 12 (the first current collector layer) and are connected to the side surface of the negative electrode connection portion 14, and a current collector region 60 which is formed by the negative electrode current collector layer exposed between the adjacent negative electrode pieces 13.

In the negative electrode sheet 10e shown in FIG. 16, gaps Lb1, Lb2, Lb3, and Lb4 between the adjacent negative electrode pieces 13 become wider gradually from the first end 5 toward the second end 6 as shown in FIG. 16 (Lb1<Lb2<Lb3<Lb4).

Further, in the solid state batteries 100 and 200 of the above-described embodiments, a case in which the first solid electrolyte sheet and the second solid electrolyte sheet continuously extend between the first end and the second end has been described as an example, but the first solid electrolyte sheet and the second solid electrolyte sheet may be disposed only between the first electrode and the second electrode piece.

Further, in the solid state batteries 100 and 200 of the above-described embodiments, a case in which the first solid electrolyte sheet and the second solid electrolyte sheet are disposed so as to sandwich the first electrode piece has been described as an example, but the first solid electrolyte sheet and the second solid electrolyte sheet may be disposed so as to sandwich not only the first electrode piece but also the second electrode piece.

Further, in the solid state battery 100 of the above-described embodiment, a case in which all of the plurality of negative electrode pieces 13 are formed such that the negative electrode active material layer 11 is formed on both surfaces of the negative electrode current collector layer 12 has been described as an example, but the negative electrode piece disposed on the outermost layer of the solid state battery may be formed such that the negative electrode active material layer is formed only on the inside of the negative electrode current collector layer. Further, the negative electrode piece 13 may be formed by integrating the negative electrode current collector layer 12 and the negative electrode active material layer 11.

Further, in the solid state batteries 100 and 200 of the above-described embodiments, a case in which all of the plurality of positive electrode pieces 23 are formed such that the positive electrode active material layer 21 is formed on both surfaces of the positive electrode current collector layer 22 has been described as an example, but the positive electrode piece disposed on the outermost layer of the solid state battery may be formed such that the positive electrode active material layer may be formed only on the inside of the positive electrode current collector layer. Further, when the positive electrode current collector layer 22 has a three-dimensional porous structure such as a mesh shape, a nonwoven fabric shape, and a foamed shape, the positive electrode current collector layer 22 and the positive electrode active material layer 21 are provided integrally.

Further, in the above-described embodiments, a case in which the solid state batteries 100 and 200 are solid-state lithium ion secondary batteries has been described as an example, but the solid state battery of the present invention may be, for example, a solid-state sodium ion secondary battery, a solid-state magnesium ion secondary battery, or the like.

Further, in the above-described embodiments, a case in which the negative electrode piece 13 and the positive electrode piece 23 have a substantially rectangular shape in a plan view has been described as an example, but the shapes of the negative electrode piece and the positive electrode piece of the solid state battery of the present invention may not be a substantially rectangular shape in a plan view and can be appropriately set in response to the application or the like of the solid state battery.

EXPLANATION OF REFERENCES 100, 200 Solid state battery
5 First end
6 Second end
7 Flat portion
8 Curved portion
10, 10d, 10e Negative electrode sheet (first sheet)
10a, 10b, 10c Laminated sheet
11 Negative electrode active material layer (first electrode active material layer)
12 Negative electrode current collector layer (first current collector layer)
13 Negative electrode piece (first electrode piece)
14 Negative electrode connection portion (first connection portion)
20 Positive electrode sheet (second sheet)
21 Positive electrode active material layer (second electrode active material layer)
22 Positive electrode current collector layer (second current collector layer)
23 Positive electrode piece (second electrode piece)
24 Positive electrode connection portion (second connection portion)
30, 30a, 30b, 31 Solid electrolyte sheet
40, 41 Electrode laminated sheet
44 Second region
45 First region
50 Negative electrode (first electrode)
60 Current collector region
L1, L2, L3, L4 Gap

What is claimed is:
1. A solid state battery comprising:
a flat laminated structure which is obtained by winding an electrode laminated sheet having a first sheet, a second sheet, and a solid electrolyte sheet laminated therein and extending from a first end to a second end,
wherein the first sheet includes a first connection portion which is formed by a first current collector layer and extends in a belt shape and a first electrode in which a first electrode active material layer is formed on the first current collector layer,
wherein the second sheet has a comb shape in a plan view by including a second connection portion which is formed by a second current collector layer and extends in a belt shape and a plurality of second electrode pieces which have a second electrode active material layer formed on the second current collector layer and are connected to a side surface of the second connection portion and a gap between the adjacent second electrode pieces becomes wider from the first end toward the second end,
wherein the solid electrolyte sheet includes a first solid electrolyte sheet and a second solid electrolyte sheet which are respectively disposed on both surfaces of the first sheet so as to sandwich the first electrode and a width of the first solid electrolyte sheet and the second solid electrolyte sheet is equal to or larger than a width of the first electrode, wherein in the electrode laminated sheet, the first sheet and the second sheet are disposed so that the first connection portion and the second connection portion face each other in a plan view, wherein a first region and a second region are alternately formed in a longitudinal direction between the first connection portion and the second connection portion, the first region being formed such that the first solid electrolyte sheet, the first electrode, the second solid electrolyte sheet, and the second electrode piece are laminated in this order and the second region being formed such that the second electrode piece, the first solid electrolyte sheet, the first electrode, and the second solid electrolyte sheet are laminated in this order, and wherein the electrode laminated sheet is wound around the first end so that the first electrode and the second electrode piece are alternately laminated so as to overlap each other in a plan view.

2. The solid state battery according to claim 1, wherein the first sheet has a comb shape in a plan view by including the first connection portion and a plurality of first electrode pieces which have a first electrode active material layer formed on the first current collector layer and are connected to a side surface of the first connection portion and a gap between the adjacent first electrode pieces becomes wider from the first end toward the second end, wherein the first solid electrolyte sheet and the second solid electrolyte sheet are disposed so as to sandwich the first electrode piece, wherein in the first region, the first solid electrolyte sheet, the first electrode piece, the second solid electrolyte sheet, and the second electrode piece are laminated in this order, wherein in the second region, the second electrode piece, the first solid electrolyte sheet, the first electrode piece, and the second solid electrolyte sheet are laminated in this order, and wherein the electrode laminated sheet is wound around the first end so that the first electrode piece and the second electrode piece are alternately laminated so as to overlap each other in a plan view.

3. The solid state battery according to claim 1, wherein the first electrode active material layer is a negative electrode active material layer and the second electrode active material layer is a positive electrode active material layer.

4. A method of manufacturing the solid state battery according to claim 1, comprising:

forming a first sheet including a first connection portion which is formed by a first current collector layer and extends in a belt shape and a first electrode in which a first electrode active material layer is formed on the first current collector layer;

forming a second sheet having a comb shape in a plan view by including a second connection portion which is formed by a second current collector layer and extends in a belt shape and a plurality of second electrode pieces which have a second electrode active material layer formed on the second current collector layer and are connected to a side surface of the second connection portion so that a gap between the adjacent second electrode pieces becomes wider from the first end toward the second end;

forming a laminated sheet by respectively laminating a first solid electrolyte sheet having a width equal to or larger than a width of the first electrode and a second solid electrolyte sheet having a width equal to or larger than the width of the first electrode on both surfaces of the first sheet so as to sandwich the first electrode;

forming an electrode laminated sheet by disposing the laminated sheet while the first connection portion and the second connection portion face each other in a plan view so as to sew between the adjacent second electrode pieces so that a first region in which the first solid electrolyte sheet, the first electrode, the second solid electrolyte sheet, and the second electrode piece are laminated in this order and a second region in which the second electrode piece, the first solid electrolyte sheet, the first electrode, and the second solid electrolyte sheet are laminated in this order are alternately formed in a longitudinal direction between the first connection portion and the second connection portion and a gap between the first region and the second region adjacent to each other becomes wider from the first end toward the second end, and winding the electrode laminated sheet around the first end in a flat shape.

5. The solid state battery according to claim 1, wherein the second electrode piece has rectangular shape in a plan view and a corner portion disposed on the side opposite to the second connection portion is chamfered as a curved surface.

6. The solid state battery according to claim 1, wherein the bag-shaped solid electrolyte layer has a configuration in which a solid electrolyte layer sheet having a porous base material and a solid electrolyte held by the porous base material is formed in a bag shape, and wherein the porous base material is formed of nylon, polyester, polyethylene, polypropylene, polytetrafluoroethylene, ethylene-tetrafluoroethylene copolymer, polyvinylidene fluoride, polyvinylidene chloride, polyvinyl chloride, polyurethane, vinylon, polybenzimidazole, polyimide, polyphenylene sulfide, polyetheretherketone, acrylic resin, or glass.

7. The solid state battery according to claim 1, wherein the bag-shaped solid electrolyte layer has a configuration in which a solid electrolyte layer sheet having a porous base material and a solid electrolyte held by the porous base material is formed in a bag shape, and wherein the solid electrolyte is sulfide solid electrolyte, oxide solid electrolyte, lithium-containing salt, or polyethylene oxide.

* * * * *